US012282278B2

(12) United States Patent
Uchiyama et al.

(10) Patent No.: US 12,282,278 B2
(45) Date of Patent: Apr. 22, 2025

(54) IMAGE FORMING APPARATUS

(71) Applicant: CANON KABUSHIKI KAISHA, Tokyo (JP)

(72) Inventors: Akihiko Uchiyama, Shizuoka (JP); Shuji Saito, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 18/134,708

(22) Filed: Apr. 14, 2023

(65) Prior Publication Data

US 2023/0333504 A1 Oct. 19, 2023

(30) Foreign Application Priority Data

Apr. 19, 2022 (JP) ................................ 2022-069005

(51) Int. Cl.

*G03G 15/22* (2006.01)
*G03G 15/00* (2006.01)
*G03G 21/00* (2006.01)

(52) U.S. Cl.

CPC ......... *G03G 15/50* (2013.01); *G03G 21/0005* (2013.01)

(58) Field of Classification Search

CPC ............... G03G 15/50; G03G 15/5033; G03G 15/5041; G03G 15/5054; G03G 15/5058; G03G 15/556; G03G 21/0005

See application file for complete search history.

(56) References Cited

U.S. PATENT DOCUMENTS

| | | | | |
|---|---|---|---|---|
| 6,507,724 | B2 | 1/2003 | Tamura et al. | |
| 2007/0116483 | A1* | 5/2007 | Kobayashi | G03G 15/0131 399/346 |
| 2012/0243891 | A1* | 9/2012 | Watanabe | G03G 15/0131 399/72 |
| 2016/0112580 | A1* | 4/2016 | Muto | H04N 1/00037 399/53 |

FOREIGN PATENT DOCUMENTS

| | | | |
|---|---|---|---|
| JP | 2001-282010 | A | 10/2001 |
| JP | 2003-29477 | A | 1/2003 |
| JP | 2009-300938 | A | 12/2009 |

* cited by examiner

*Primary Examiner* — Thomas S Giampaolo, II
(74) *Attorney, Agent, or Firm* — Venable LLP

(57) ABSTRACT

An image forming apparatus includes an endless image bearing member, a toner image forming portion, a light source, a detecting portion, a removing member, and a controller. The controller carries out control so that first measurement for detecting reflected light by the detecting portion by irradiating toner, supplied to a first region detectable by the detecting portion, with the light from the light source and second measurement for detecting the reflected light by the detecting portion by irradiating a surface of the image bearing member with light from the light source are made executable. In a case that the second measurement is executed, the controller carries out control so that the toner is supplied to the nip in a second region different from the first region.

17 Claims, 15 Drawing Sheets

IMAGE FORMING APPARATUS

FIELD OF THE INVENTION AND RELATED ART

The present invention relates to an image forming apparatus, for example, a color image forming apparatus.

Conventionally, as the color image forming apparatus, such as a copying machine or a printer, of an electrophotographic type, a color image forming apparatus of an intermediary transfer type has been known. In the color image forming apparatus of the intermediary transfer type, a toner image formed on a photosensitive drum is primary-transferred onto an intermediary transfer member and then is secondary-transferred on a transfer material (transfer-receiving material). In this time, on the intermediary transfer member, toner which cannot be completely transferred onto the transfer material remains as residual toner, and therefore, the residual toner is required to be removed. As a cleaning means for removing the residual toner, a plate-like cleaning member (cleaning blade) formed of an elastic material such as a rubber is frequently used. Further, an edge of the cleaning blade is contacted to the intermediary transfer member, so that the residual toner is scattered off and is removed. This cleaning blade type is simple in constitution and is inexpensive, and is excellent in residual toner removing performance, so that the cleaning blade type has been widely put into practical use.

On the other hand, in the color image forming apparatus of the intermediary transfer type, nitrogen oxides, a toner resin, and the like are deposited on a surface of the intermediary transfer member, whereby friction coefficient of the surface of the intermediary transfer member becomes large. By this, a frictional force of a cleaning nip which is a contact portion between the edge portion of the cleaning blade and the intermediary transfer member also becomes large. When this frictional force becomes large, stick-slip motion of the cleaning blade generates, so that improper cleaning, abnormal noise (lade squeaking), and abnormal vibration (chattering) generates. When this state is continued, finally, there is a liability that an image defect due to breakage or the like of the edge portion of the cleaning blade or the surface of the intermediary transfer belt generates. In order to solve such a problem, for example, in Japanese Laid-Open Patent Application 2001-282010, a method in which a toner image as a lubricant is periodically supplied to the cleaning nip has been proposed.

Further, the color image forming apparatus is always required from markets that an output image is improved in image quality. In general, the color image forming apparatus fluctuates in resultant image density and gradation characteristic when respective portions of the apparatus fluctuate due to a change in environment and use for a long time. Such a fluctuation disturbs a color balance of an output image and largely lowers a quality of the output image (also referred to as an image quality). Accordingly, in order to obtain a high-quality image, there is a need to provide the color image forming apparatus with an adjusting means for always maintaining a certain density and a certain gradation characteristic.

Therefore, by the following method, a constitution in which a stable density and a stable gradation characteristic can be obtained is employed. First, a test toner image which is called a patch is formed on the intermediary transfer member under a predetermined image forming condition by using toners of colors provided in the color image forming apparatus. A toner application amount (toner weight per unit area) of the formed patch is detected by an optical sensor or the like, so that density-related information (density, chromaticity, and the like) is acquired. Then, image density control in which from a relationship between the image forming condition when the patch is formed and the density-related information of the formed patch, feed-back to the image forming condition is carried out. By this, it is possible to obtain an image with the stable density and the stable gradation characteristic.

However, in the conventional image density control, before the patch is formed, there is a need to perform a preparatory operation such as measurement of a peripheral length of the intermediary transfer member which is an image bearing member and measurement of a surface state, and therefore, rotation (circulation) of the intermediary transfer member in a state in which the toner image is not formed generates in more times than that during normal image formation. Particularly, when the image density control is carried out in a state in which a frictional force of the cleaning nip becomes large, such as in a high-temperature/high-humidity environment, the cleaning blade gets into a situation such that the stick-slip motion is liable to occur.

SUMMARY OF THE INVENTION

The present invention has been accomplished in the above-described circumstances.

A principal object of the present invention is to provide an image forming apparatus capable of reducing a frictional force of a cleaning nip in image density control.

According to an aspect of the present invention, there is provided an image forming apparatus comprising: an endless image bearing member; a toner image forming portion configured to form a toner image on the image bearing member; a light source configured to irradiate a surface of the image bearing member and the toner image formed on the image bearing member with light; a detecting portion configured to detect reflected light reflected by the image bearing member or the toner image formed on the image bearing member by irradiating the image bearing member or the toner image formed on the image bearing member with light from the light source; a removing member configured to form a nip in contact with the image bearing member and to remove toner from the image bearing member in the nip; and a controller configured to control an image forming condition when the toner image is formed on a transfer material, on the basis of a result that the reflected light reflected by the toner supplied to a first region detectable by the detecting portion on the image bearing member is detected, wherein the controller carries out control so that first measurement for detecting the reflected light by the detecting portion by irradiating the toner with the light from the light source and second measurement for detecting the reflected light by the detecting portion by irradiating the surface of the image bearing member with light from the light source are made executable, and wherein in a case that the second measurement is executed, the controller carries out control so that the toner is supplied to the nip in a second region different from the first region.

Further features of the present invention will become apparent from the following description of exemplary embodiments with reference to the attached drawings.

Figure 2:
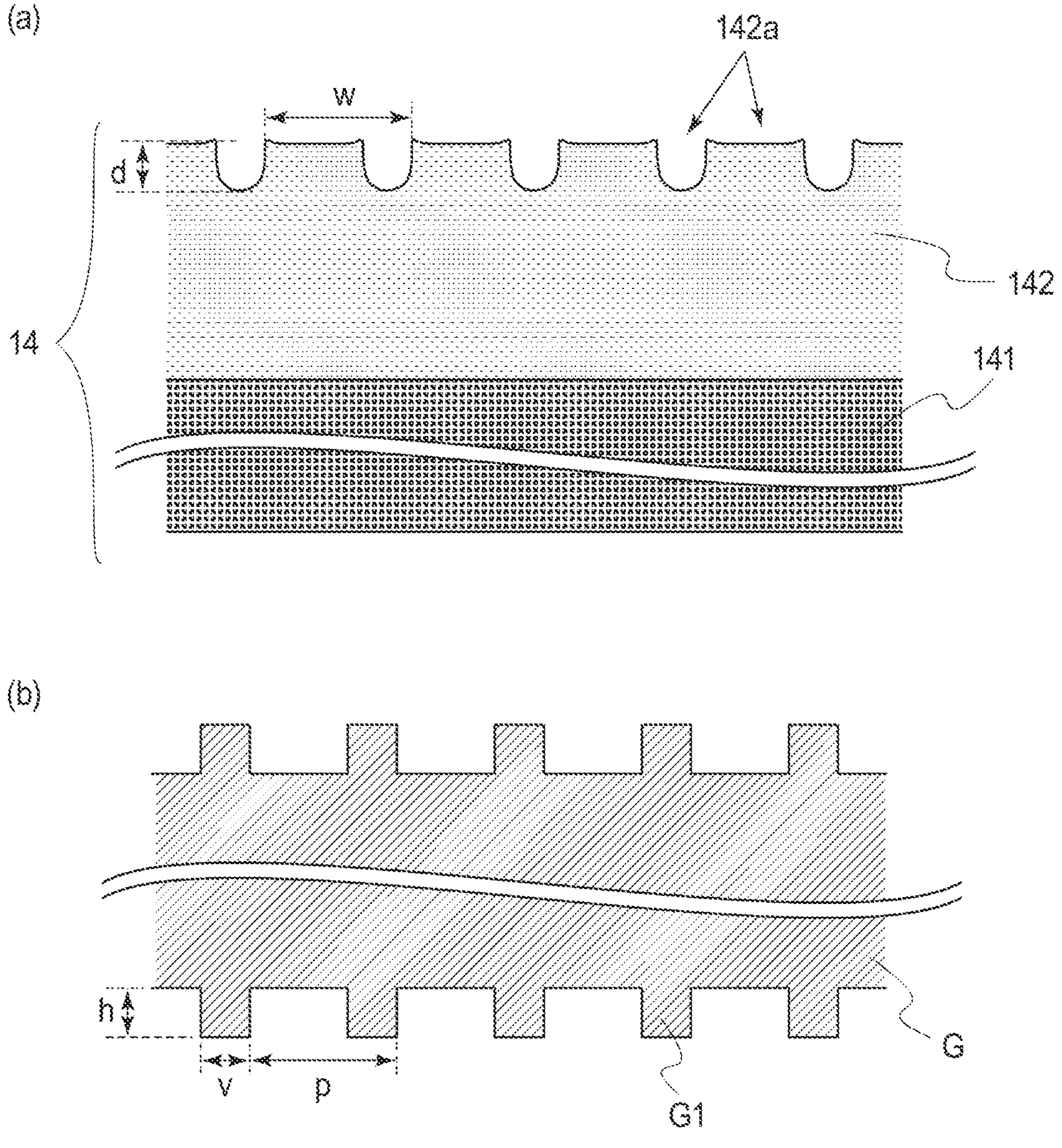

Parts (a) and (b) of FIG. 2 are enlarged schematic views of an intermediary transfer belt and an imprint processing metal mold, respectively, in the embodiments 1 and 2.

Figure 3:
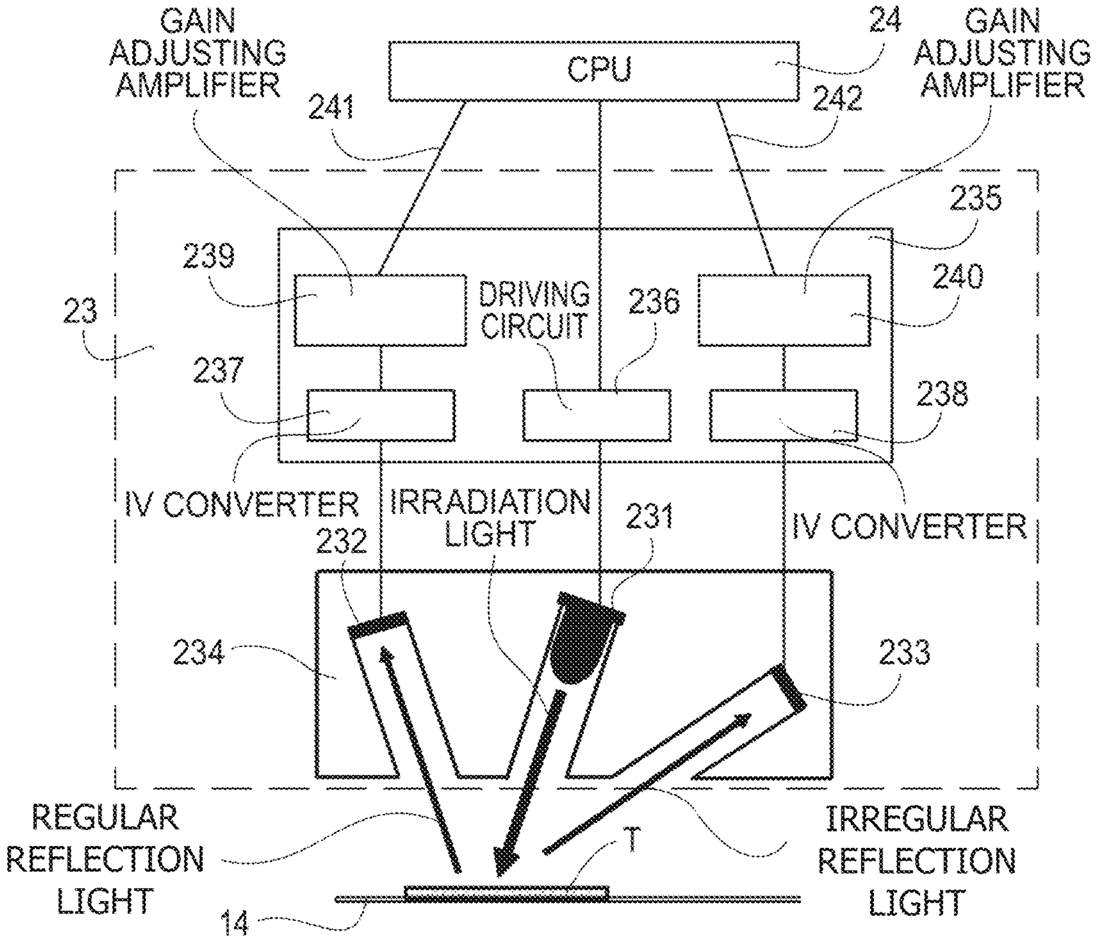

FIG. 3 is a schematic constitution view of an optical sensor in the embodiments 1 and 2.

Figure 4:
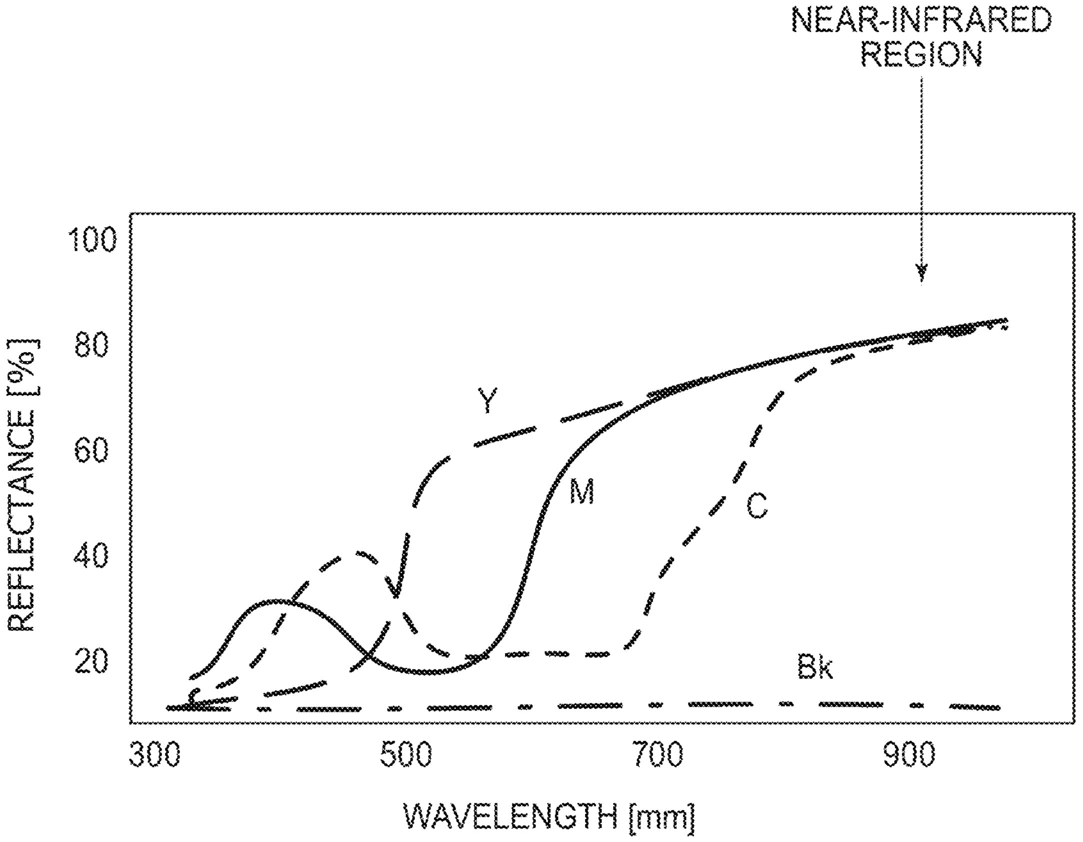

FIG. 4 is a graph showing spectral reflectance of toner in the embodiments 1 and 2.

Figure 5:
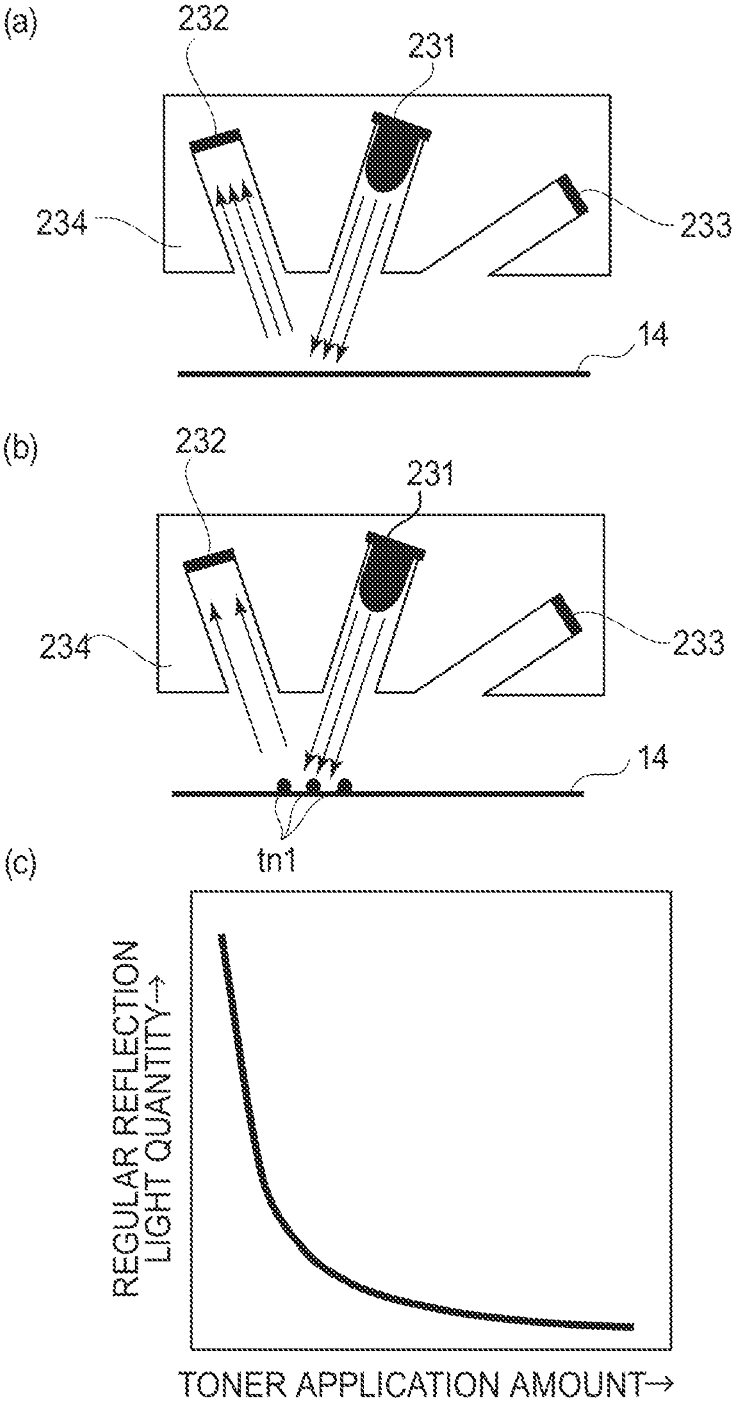

Parts (a) to (c) of FIG. 5 are schematic views each showing a state of reflected light when the intermediary transfer belt is irradiated with irradiation light of the optical sensor in the embodiments 1 and 2.

Figure 6:
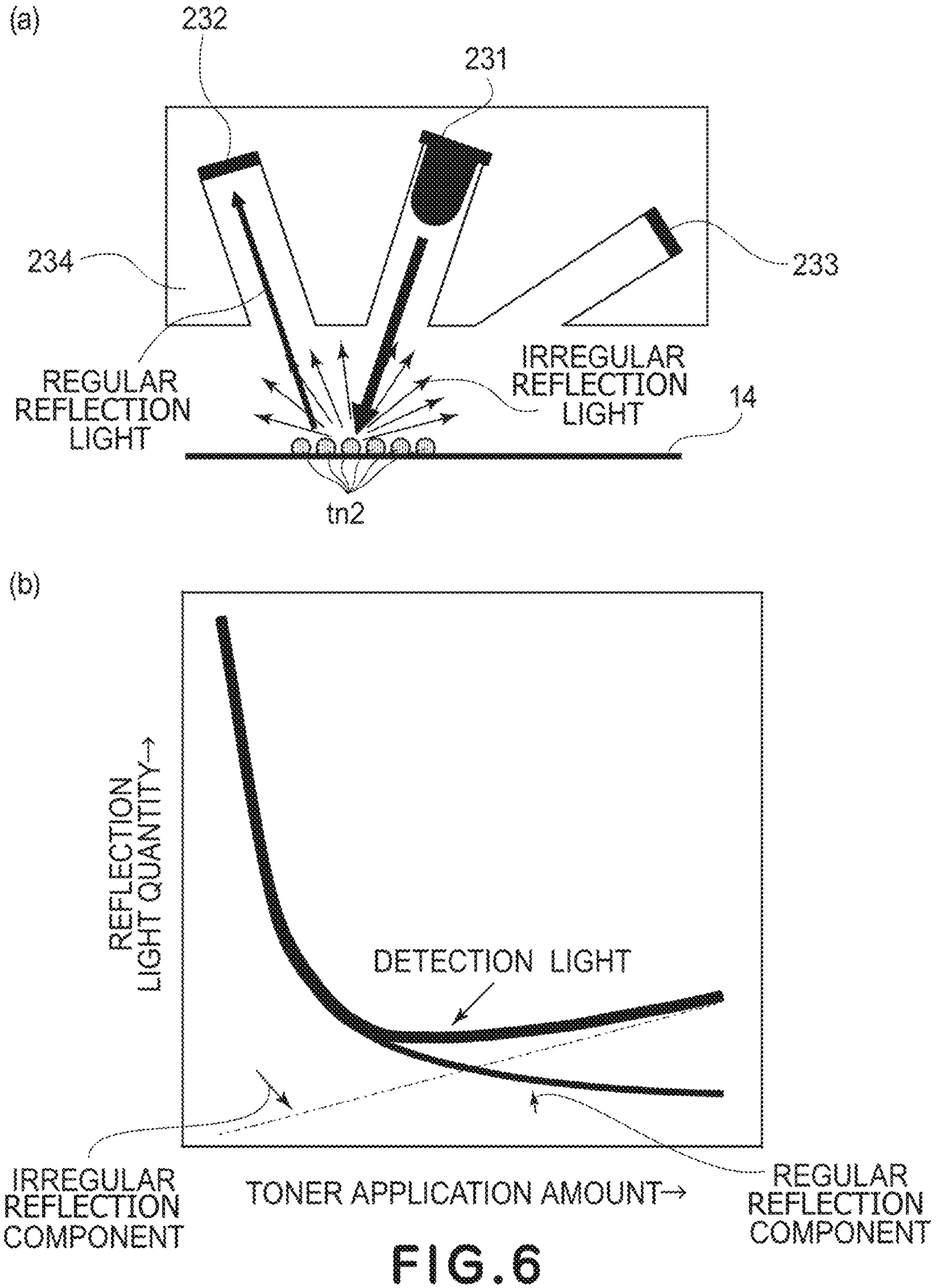

Parts (a) and (b) of FIG. 6 are schematic views each showing a state of reflected light from black toner to the optical sensor in the embodiments 1 and 2.

Figure 7:
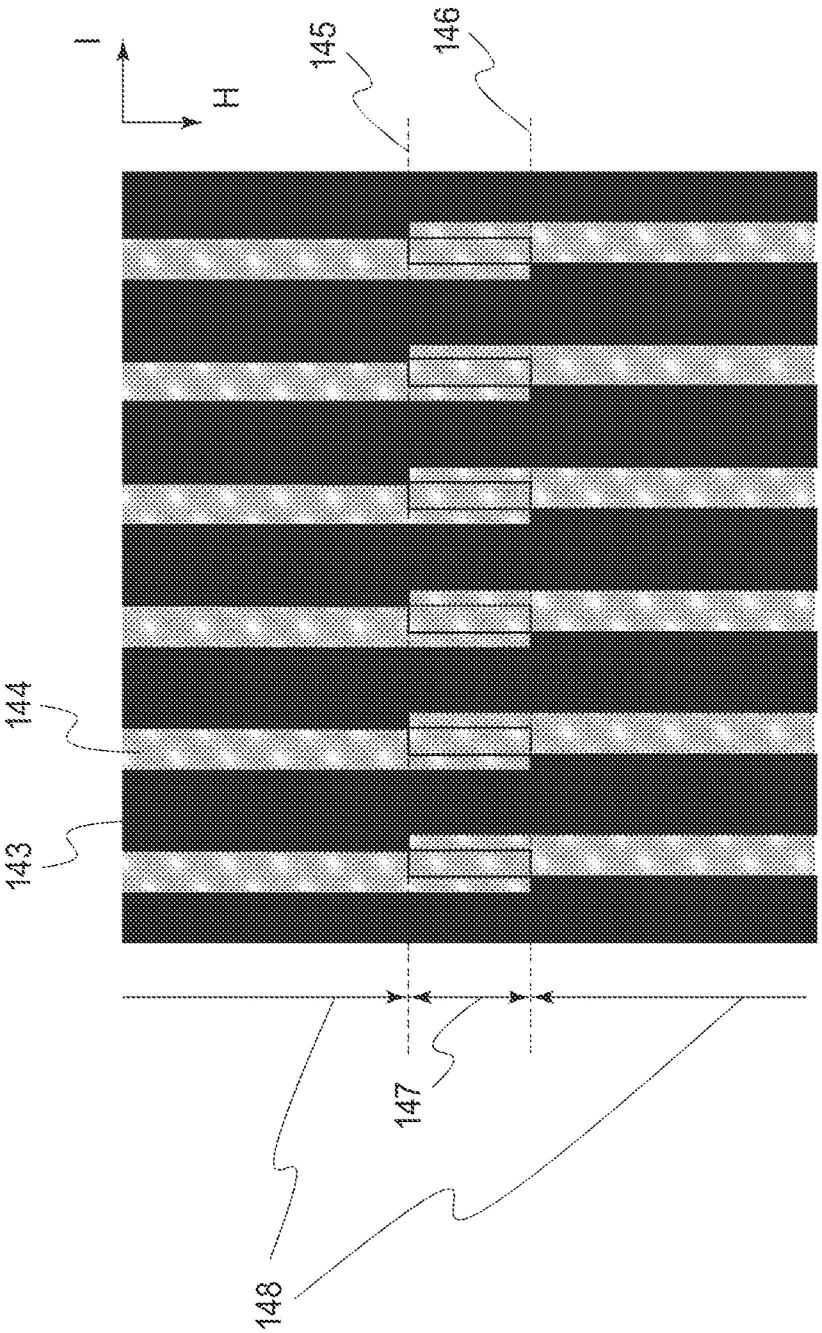

FIG. 7 is an enlarged schematic view of an imprint overlapping portion of the intermediary transfer belt in the embodiments 1 and 2.

Figure 8:
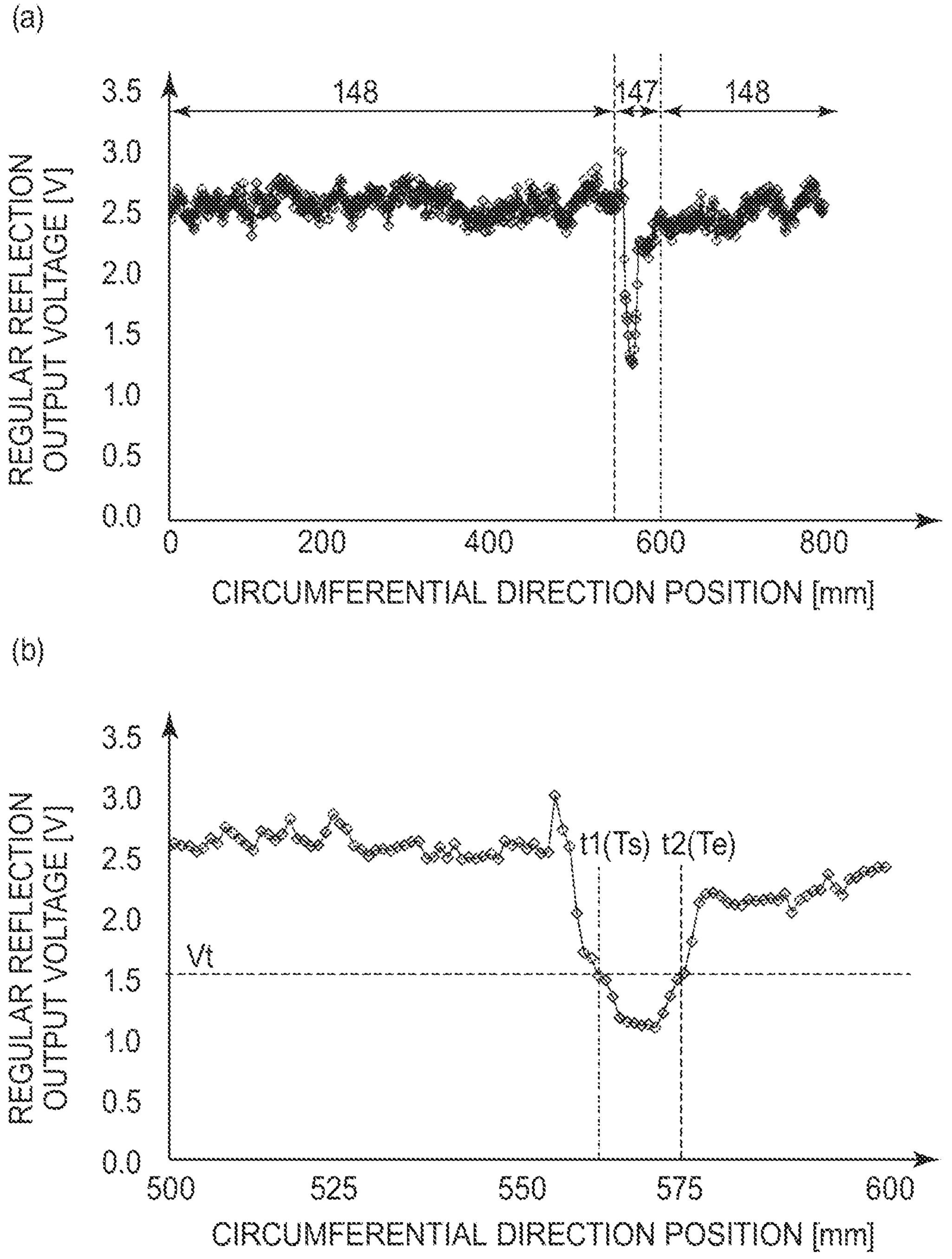

Parts (a) and (b) of FIG. 8 are graphs each showing a state of regular reflection output in the neighborhood of the imprint overlapping portion in the embodiments 1 and 2.

Figure 9:
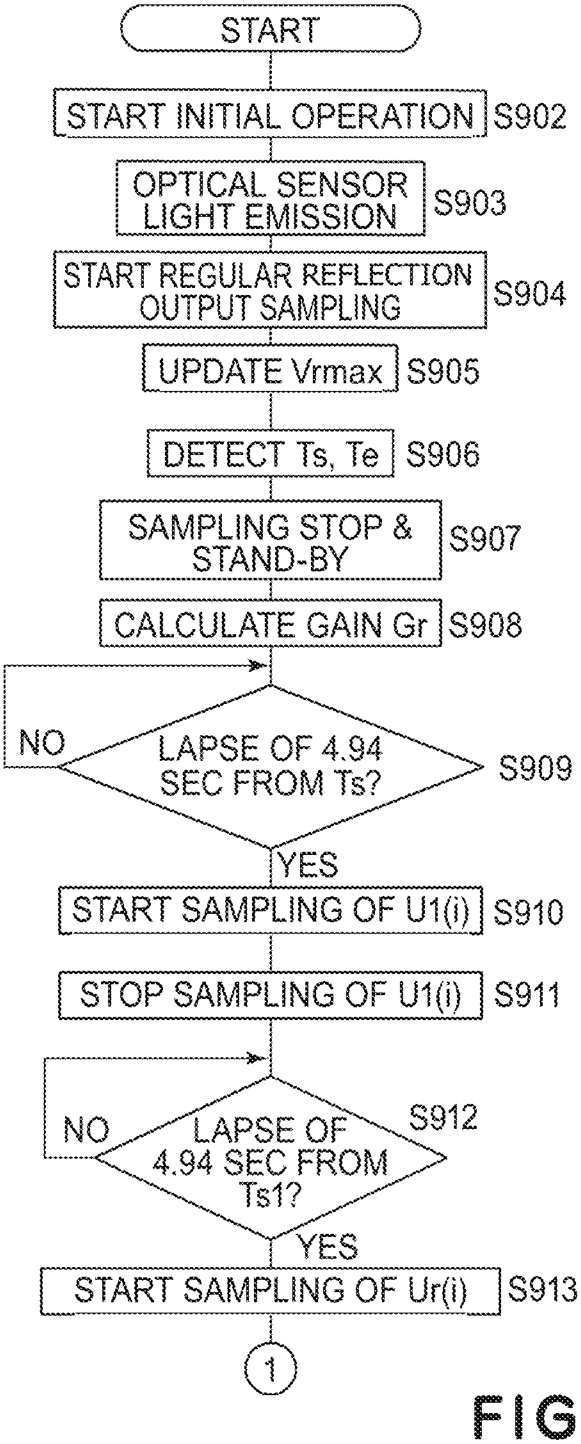

FIG. 9 is a flowchart showing an image density control step in the embodiment 1.

Figure 10:
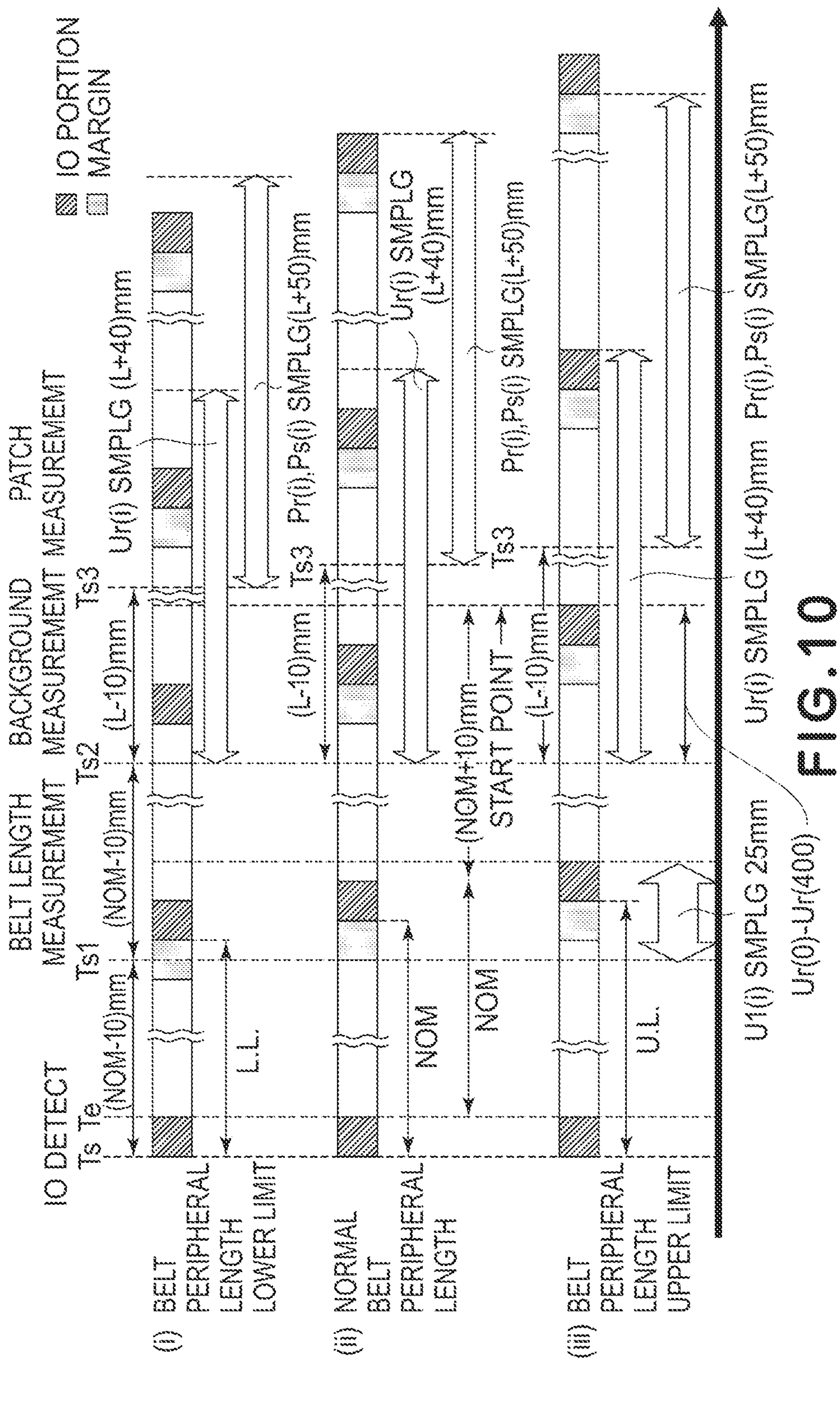

FIG. 10 is a timing chart showing a relationship between various timings in the image density control step in the embodiment 1.

Figure 11:
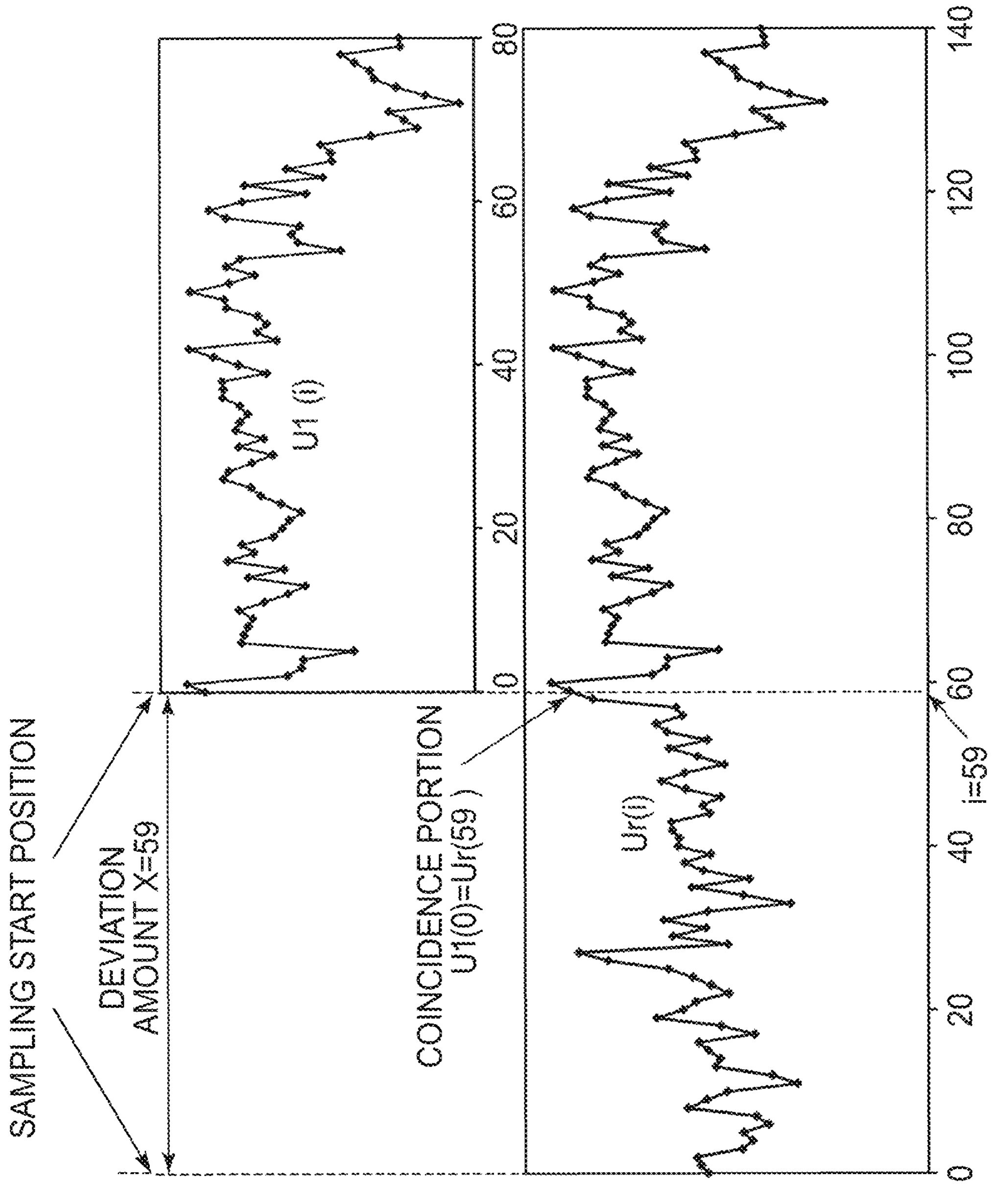

FIG. 11 is a graph showing a relationship of a deviation amount between sampling data in the embodiment 1.

Figure 12:
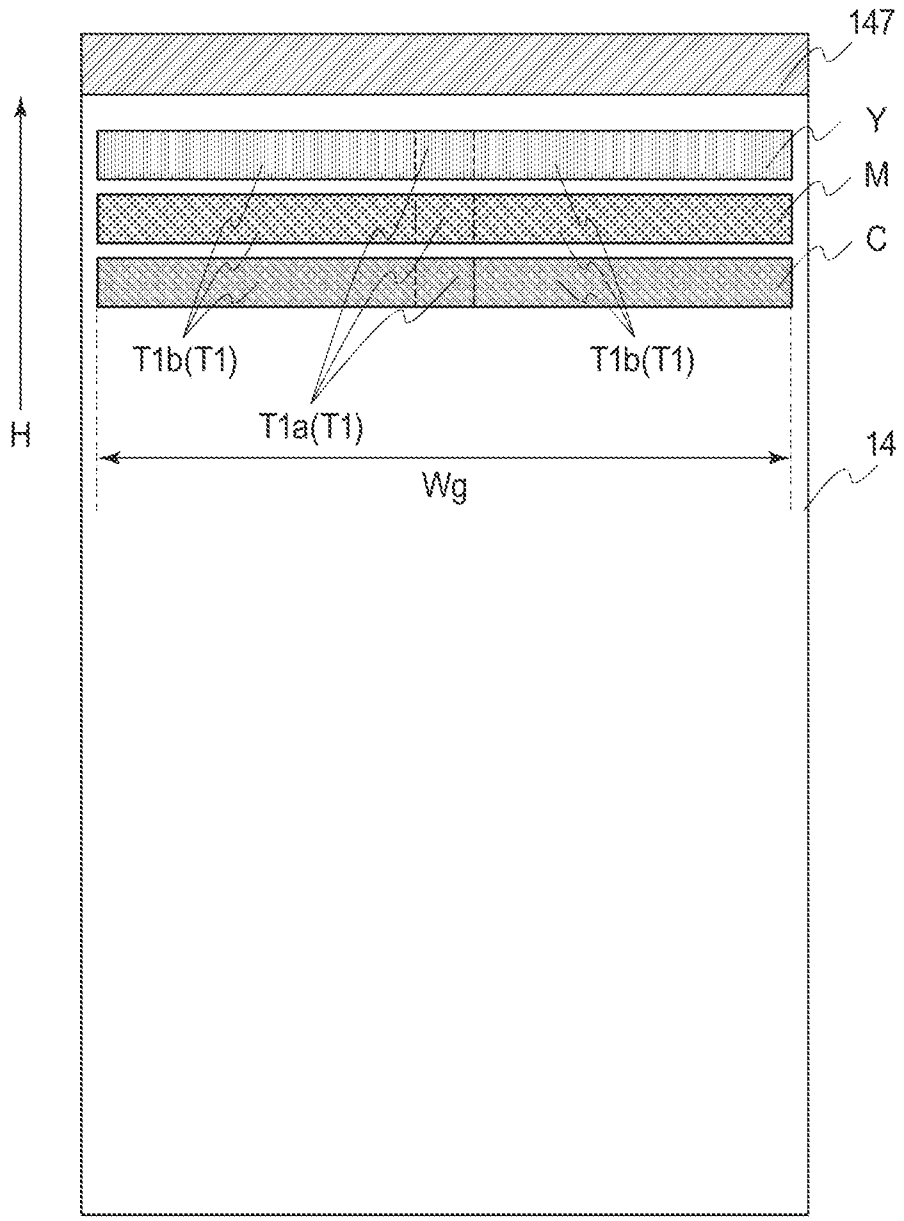

FIG. 12 is a schematic view showing a constitution of a gain adjusting patch and a lubricating toner image in the embodiment 1.

Figure 13:
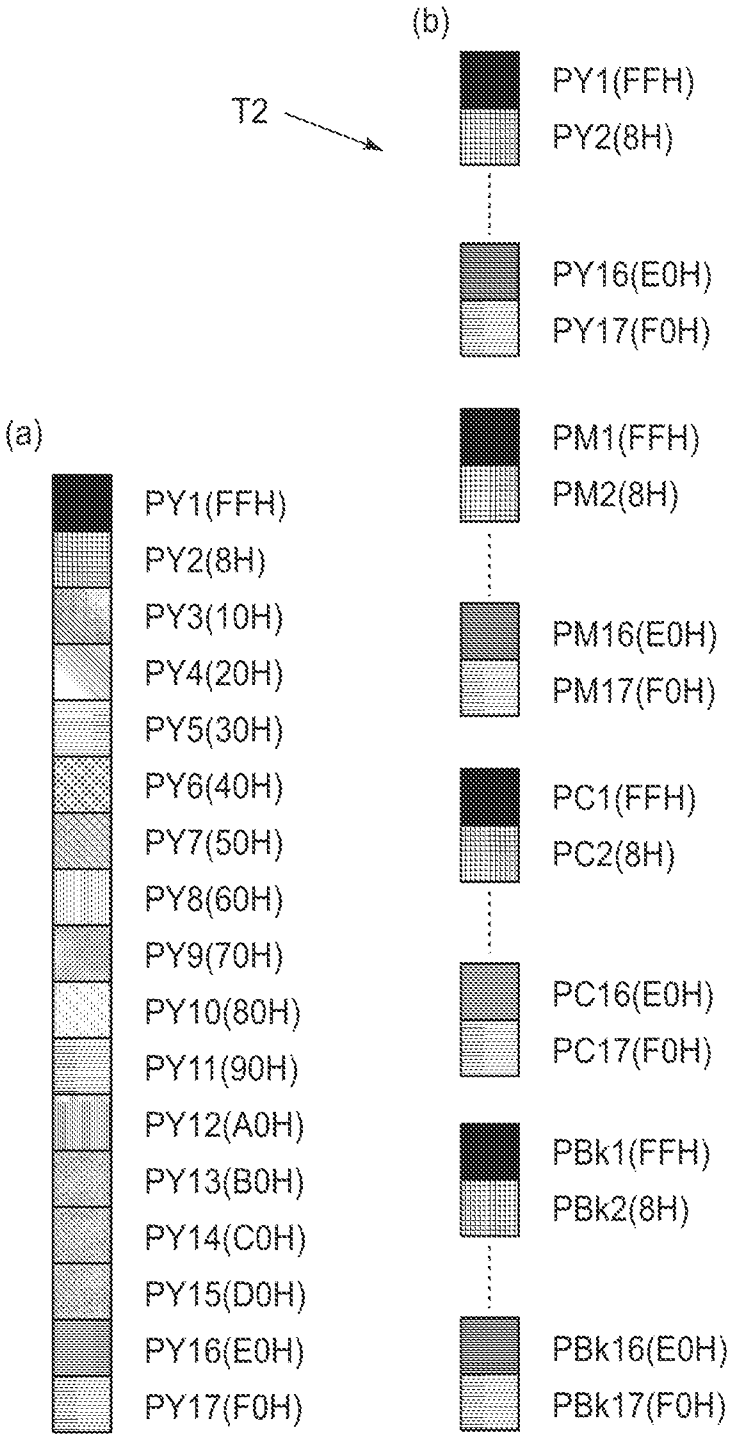

Parts (a) and (b) of FIG. 13 are schematic views each showing a constitution of a patch in patch measurement in the embodiment 1.

Figure 14:
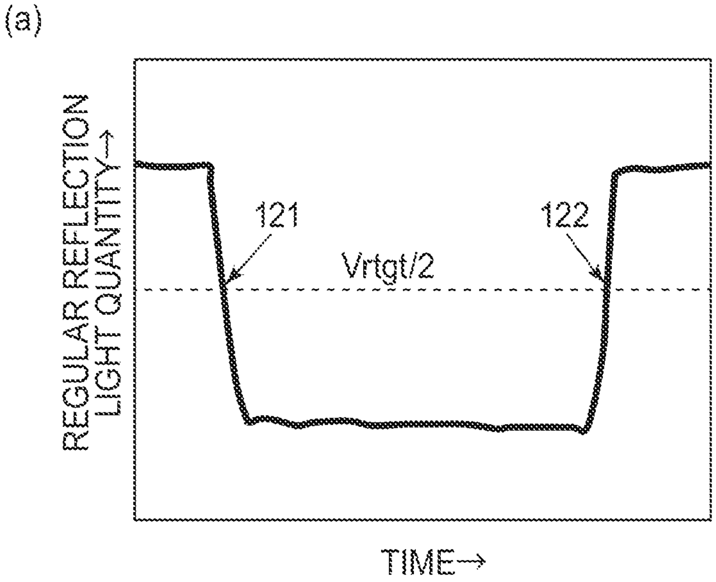
Figure 14:
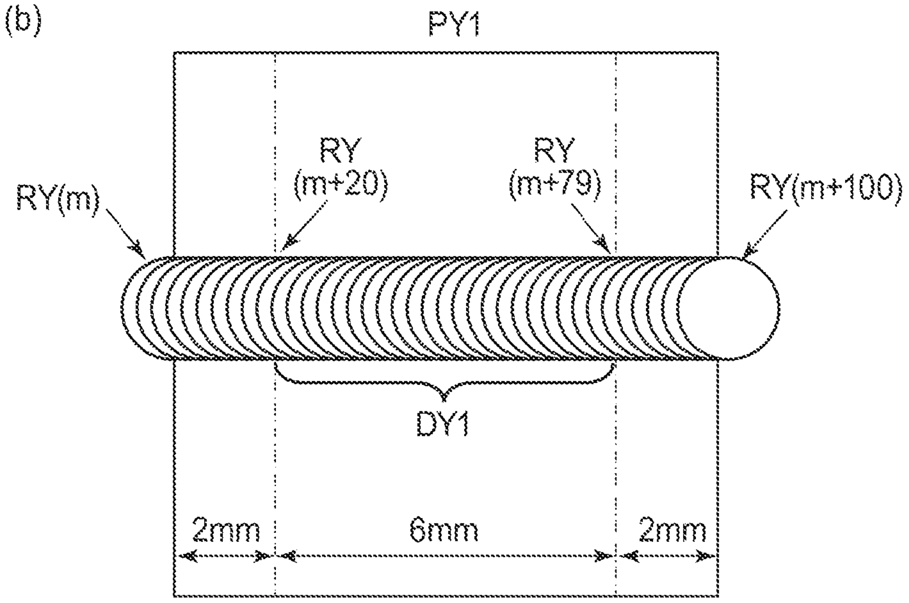

Parts (a) and (b) of FIG. 14 are schematic views showing a relationship between the patch and a patch measuring spot.

Figure 15:
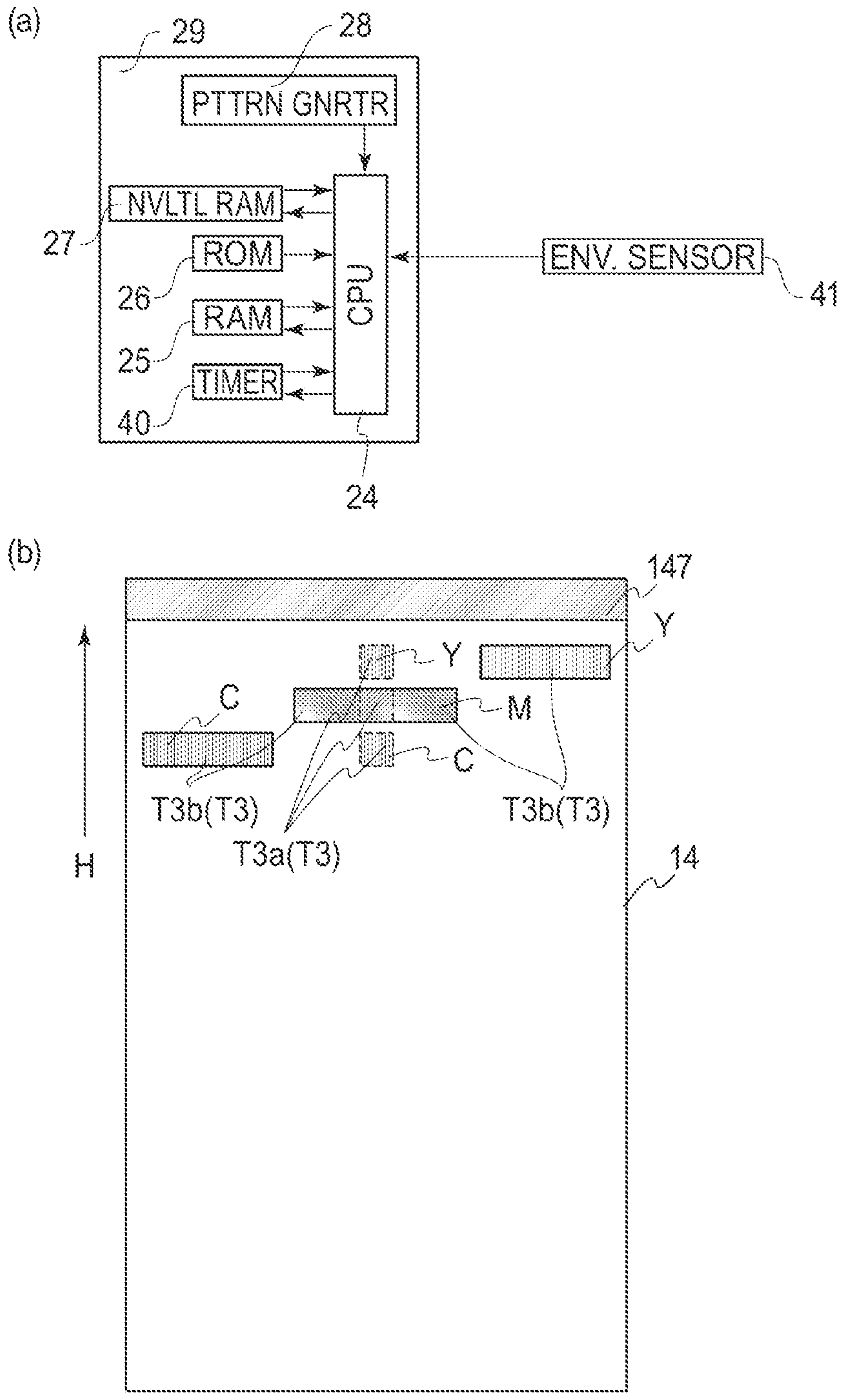

Parts (a) and (b) of FIG. 15 are schematic view showing a controller and a lubricating toner image, respectively, in the embodiment 2.

DESCRIPTION OF THE EMBODIMENTS

In the following, embodiments for carrying out the present invention will be specifically described while making reference to the drawings.

An image forming apparatus according to an embodiment 1 will be specifically described using FIGS. 1 to 14.

However, as regards dimensions, materials, shapes, relative arrangement, and the like of component parts described in this embodiment, the scope of the present invention is not intended to be limited only thereto unless otherwise specified.

Image Forming Apparatus

Figure 1:
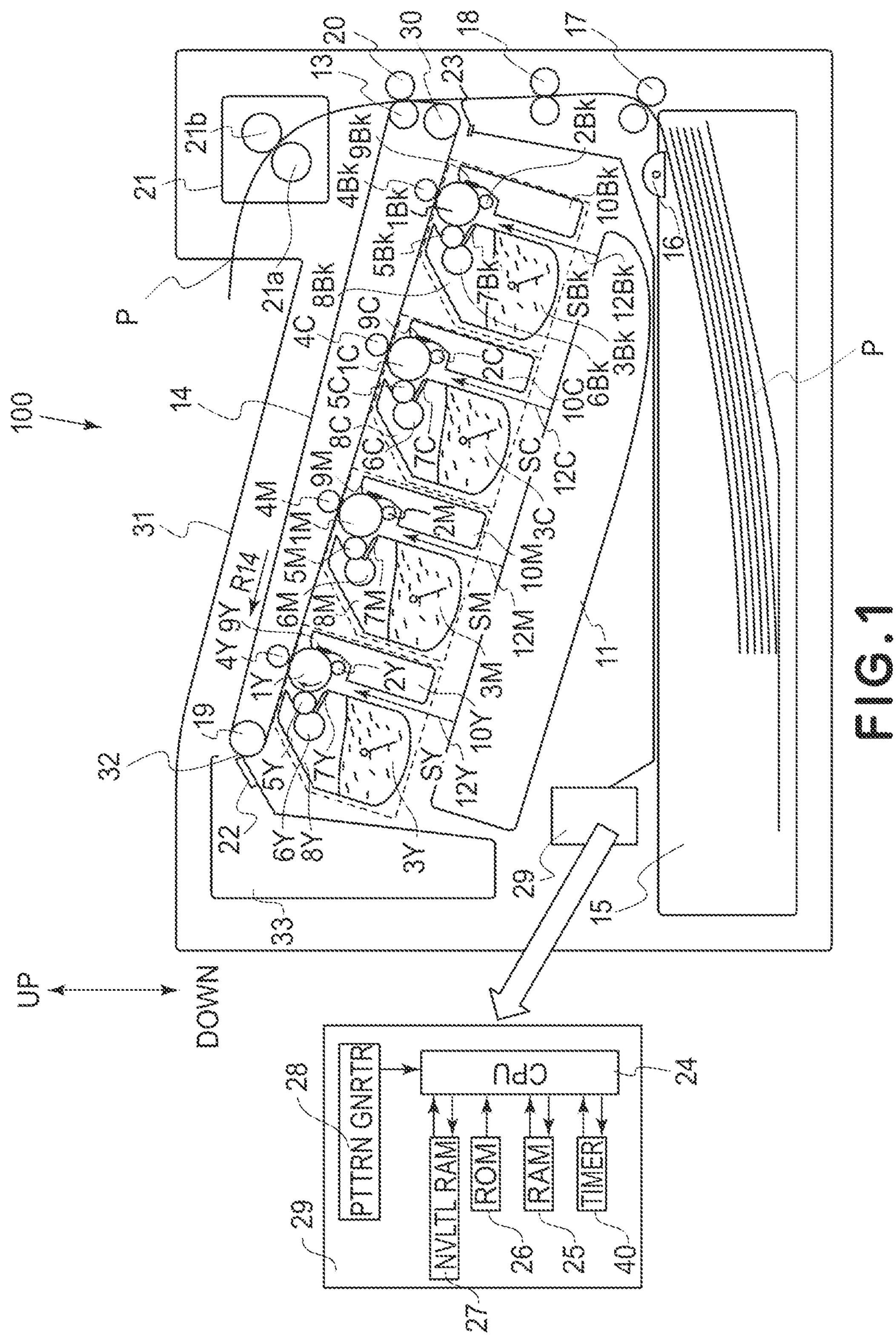
FIG. 1 is a schematic longitudinal sectional view showing a structure of an image forming apparatus according to embodiments 1 and 2.

In FIG. 1, an image forming apparatus 100 for forming a color image on a transfer material (transfer-receiving material) is shown, and an up-down direction is also shown. The image forming apparatus 100 shown in FIG. 1 is a full-color tandem image forming apparatus 100 of an intermediary transfer member type using an intermediary transfer member which is an image bearing member, and FIG. 1 is a schematic longitudinal sectional view showing a general constitution thereof. In the image forming apparatus 100 shown in FIG. 1, four image forming portions which are image forming means, i.e., image forming portions SY, SM, SC, and SBk for forming toner images of yellow (Y), magenta (M), cyan (C), and black (Bk), are arranged from an upstream side to a downstream side. Here, "upstream" and "downstream" refer to those directions with respect to a movement direction (rotational direction) of an intermediary transfer belt 14 (described later). On the image forming portions SY, SM, SC, and SBk, the intermediary transfer belt 14, which is the intermediary transfer member extended and stretched around rollers 13, 19, and 30, is provided. A structure of the intermediary transfer belt 14 will be described later. In the following, suffixes Y, M, C, and Bk of reference numerals will be omitted except that members used in image formation for a specific color are described.

Each of the image forming portions S includes a process cartridge of an integral type consisting of a drum unit 10 and a developing unit 8. Of these units, the drum unit 10 includes a photosensitive drum 1 which is a photosensitive member having an OPC (organic photo-conductor) photosensitive layer, a cleaning blade 9 comprising an elastic rubber, and a charging roller 2. Further, a developing unit 8 includes a developing roller 5 which is a developing means, non-magnetic one-component toner 3 chargeable to a negative polarity, a toner applying roller 6, and a toner applying blade 7.

Below the image forming portions SY, SM, SC, and SBk, an exposure device 11 constituted by a scanner unit for scanning the photosensitive drum surface with laser light by a polygonal mirror is provided. The photosensitive drums 1Y, 1M, 1C, and 1Bk are irradiated with scanning beams 12Y, 12M, 12C, and 12Bk, respectively, each modulated on the basis of image data, so that electrostatic latent images are formed. In the embodiment 1, the image data is 8-bit data, i.e., 00H to FFH (H: hexadecimal rotation) of 256 levels. The image data FFH represents an image with a highest image density (hereinafter, referred to as a solid image), and the image density becomes lower with decreasing image data. The image data 00H is a non-image (hereinafter, referred to as a solid white image).

Inside the intermediary transfer belt 14, primary transfer rollers 4Y, 4M, 4C, and 4Bk pressing the intermediary transfer belt 14 against the photosensitive drums 1Y, 1M, 1C, and 1Bk, respectively, from above are provided.

To each of these primary transfer rollers 4, a positive-polarity voltage subjected to constant-current control is applied from a power source (not shown), so that the toner image formed on the photosensitive drum (photosensitive member) 1 is transferred onto the intermediary transfer belt (image bearing member) 14 (hereinafter, referred to as primary transfer). A secondary transfer roller 20 transfers the toner image from the intermediary transfer belt 14 onto a transfer material P (hereinafter, referred to as secondary transfer). To the secondary transfer roller 20, a positive-polarity voltage subjected to the constant-current control is applied from a power source (not shown).

Of the three rollers 13, 19, and 30 supporting the intermediary transfer belt 14, the roller 13 is a driving roller also functioning as a secondary transfer opposite roller and forms a secondary transfer nip between itself and the secondary transfer roller 20 through the transfer material P while driving and conveying the intermediary transfer belt 14 in an arrow R14 direction. The roller 30 is an auxiliary roller and maintains a predetermined angle between the transfer material P and the intermediary transfer belt 14 surface in the neighborhood of the secondary transfer nip, so that abnormal electric discharge between the transfer material P and the toner image on the intermediary transfer belt 14 is suppressed. The roller 19 is a tension roller and stretches the intermediary transfer belt 14 with a predetermined tension.

Opposing the roller 19 with respect to the intermediary transfer belt 14, a cleaning blade 22 which is a removing means is provided. The cleaning blade 22 forms a nip in contact with the intermediary transfer belt 14, and removes the toner on the intermediary transfer belt 14 in the nip. The cleaning blade 22 comprises a plate blade of a urethane rubber as an elastic blade for removing toner remaining on the intermediary transfer belt 14 without being transferred onto the transfer material P in the secondary transfer (hereinafter, the toner is referred to as transfer residual toner). The cleaning blade 22 is positioned relative to the roller 19, so that a predetermined amount and a penetration (entering) amount are maintained for movement of the roller 19. In the embodiment 1, a longitudinal width in which the image can be formed is, for example, 214 mm, and therefore, a longitudinal width of the cleaning blade 22 is set at 220 mm. Here, the longitudinal width refers to a length in a longitudinal direction, and the longitudinal direction is a rotational axis direction of the roller 19. A fixing device 21 is constituted by a fixing roller 21*a* and a pressing roller 21*b*, and melts and fixes an unfixed toner image formed on the transfer material P.

Controller

The image forming apparatus 100 includes a controller 29, and on a left-hand side of FIG. 1, a detailed constitution of the controller 29 is shown. The controller 29 of the image forming apparatus 100 includes a CPU 24, a RAM 25, a ROM 26, a non-volatile RAM 27, a pattern generating portion 28, and a timer 40. The CPU 24, in addition to the exposure device 11, the RAM 25, the ROM 26, the non-volatile RAM 27, the pattern generating portion 28, and the like are connected. The ROM 26 is a read-only storing portion (memory) and in which programs and various image data for controlling the image forming apparatus 100 by the CPU 24 are written. The RAM 25 is a random-access memory and in which data in the ROM 26 are developed and data for image density control (described later) are stored. The pattern generating portion 28 generates image data of a patch for the image density control (described later). The non-volatile RAM 27 is a random-access memory in which recording contents are maintained even when the power source of the image forming apparatus 100 is shut off. The timer 40 is used when the CPU 24 carries out various pieces of timing control of the image forming apparatus 100.

Image Forming operation

When an image forming operation is started, the photosensitive drum 1. the intermediary transfer belt 14, and the like start rotation in arrow directions at a predetermined process speed (160 mm/s in this embodiment). The photosensitive drum 1 is electrically charged uniformly by the charging roller 2 to which a predetermined voltage is applied. Then, an electrostatic latent image based on an image signal is formed by a scanning beam 12 from the exposure device 11. The electrostatic latent images for the respective colors at this time are formed at predetermined timings, respectively, so that the resultant toner images for the four colors are superposed later on the intermediary transfer belt 14 to form a full-color toner image. When each of the exposed photosensitive drums 1 is further rotated, the electrostatic latent image on each photosensitive drum 1 is visualized (developed) by the developing roller 5 to which a developing voltage is applied. Then, on the photosensitive drums 1Y, 1M, 1C, and 1Bk, the toner images of Y, M, C, and Bk are formed, respectively. When the toner image on the photosensitive drum 1Y is further rotated, the yellow toner image is transferred onto the intermediary transfer belt 14 by the primary transfer roller 4Y to which a transfer voltage is applied. Then, in synchronism with conveyance of the yellow toner image on the intermediary transfer belt 14, the toner images of M, C, and Bk are successively transferred onto the intermediary transfer belt 14 under application of the transfer voltages to the primary transfer rollers 4M, 4C, and 4K, respectively, so that the toner images of the four colors (Y, M, C, Bk) are formed on the intermediary transfer belt 14.

The transfer materials P stacked in a sheet feeding cassette 14 are fed by a semilunar feeding roller 16 and separated one by one by a separation roller 17, and then the separated transfer material P (sheet) is conveyed to and once stopped by a registration roller pair 18. The once stopped transfer material P is conveyed (supplied) to the secondary transfer nip by the registration roller pair 18 in synchronism with a timing when the toner images of the four colors, i.e., the full-color toner image formed on the intermediary transfer belt 4 reach the secondary transfer nip. Then, the full-color toner image on the intermediary transfer belt 14 is transferred onto the transfer material P under application of a voltage to between the secondary transfer roller 20 and the secondary transfer opposite roller 13. The transfer material P on which the toner image is transferred is separated from the intermediary transfer belt 14 and is sent to the fixing device 21. Then, in the fixing device 21, the transfer material P is heated and pressed by the fixing roller 21*a* and the pressing roller 21*b*, so that the toner image is melt-fixed on the surface of the transfer material P, and then the transfer material P is discharged onto a discharge tray 31.

Transfer residual toner remaining on the photosensitive drum 1 without being transferred onto the intermediary transfer belt 14 in the primary transfer is removed by the cleaning blade 9. Transfer residual toner remaining on the intermediary transfer belt 14 without being transferred onto the transfer material P in the secondary transfer is removed in a cleaning nip 32 which is a contact portion between an edge portion of the cleaning blade 22 and the intermediary transfer belt 14, and is collected in a residual toner container 33. An optical sensor 23 will be described later.

Intermediary Transfer Belt

Part (a) of FIG. 2 is an enlarged schematic view of the intermediary transfer belt 14 as viewed in a cross-sectional direction. The intermediary transfer belt 14 has an endless shape and includes a base layer 141 and a surface layer 142. In the embodiment 1, the surface light 142 contacts the cleaning blade 22, and the base layer 141 contacts the rollers 13, 19, and 30. The base layer 141 is prepared by dispersing carbon black as an electroconductive agent in a base material of a polyethylene naphthalate resin, and is adjusted so that volume resistivity thereof is, for example, $1\times10^{10}$ Ω·cm. Further, the base layer 141 is 70 μm in layer thickness, and a color thereof is, for example, black. Incidental in the constitution of the embodiment 1, the polyethylene naphthalate was used as the base material, and the carbon black was employed as the electroconductive agent, but the present invention is not limited to this constitution.

The surface layer 142 is prepared by dispersing, for example, zinc oxide as an electric resistance adjusting agent in a base material comprising an acrylic resin. Further, a layer thickness thereof is about 3 μm. As a material of the surface layer 142, from viewpoints of strength such as an anti-wearing property and anti-crack property, a resin material (curable resin) of curable materials is desirable, and particularly, an acrylic resin obtained by curing an acrylic copolymer having unsaturated double bonds is desired. Incidentally, the acrylic resin is transparent, and therefore, the color of the intermediary transfer belt 14 is black as a whole.

In order to improve the anti-wearing property of the surface of the cleaning blade 22 with long-term use, the surface of the intermediary transfer belt 14, specifically the surface layer 142 is provided with a minute uneven shape (projections and recesses) 142*a*. In part (a) of FIG. 2, only a part of the minute uneven shape is represented by the reference symbol 142*a*. As a processing method of the minute uneven shape 142*a*, polishing (processing), cutting (processing), imprint processing, and the like are generally known, but in the constitution of the embodiment 1, the imprint processing was employed from viewpoints of a processing cost, productivity, shape accuracy, and the like.

In the imprint processing, first, the intermediary transfer belt 14 is press-fitted in a core made of a steel material for a carbon tool steel. Part (b) of FIG. 2 is an enlarged schematic view of an imprint processing metal mold G for forming the minute uneven shape (portion) 142*a* on the surface of the intermediary transfer belt 14. The imprint processing metal mold G is provided with projections G1 by cutting (processing) so as to extend in parallel to a circumferential direction of a cylinder in regular intervals p=7.0 μm with a projection end width v=2.0 μm and a height h=2.0 μm. Incidentally, in part (b) of FIG. 2, for easy recognition, only one projection is represented by G1. The metal mold G is heated by a heater (not shown) to a temperature of 130° which is 5-15° C. higher than a glass transition temperature of the polyethylene naphthalate which is the base material of the base layer 141. In a state in which the intermediary transfer belt 14 is contacted to the metal mold G, the core is rotated once at a peripheral speed of 264 mm/s, so that the metal mold G is rotated by this rotation, and thereafter, is separated, whereby the intermediary transfer belt 14 of which surface is subjected to the imprint processing is obtained. By this, the intermediary transfer belt 14 in the embodiment 1 is black, and the projected portion of the surface of the intermediary transfer belt 14 is a mirror surface.

When a surface shape of the intermediary transfer belt 14 after the imprint processing was observed using a laser microscope VK-X250 manufactured by KEYENCE CORPORATION, it was confirmed that recessed-shape grooves of 7.5 μm in interval w and about 1.0 μm in depth d occurred. By these minute uneven shapes 142*a*, the frictional force between the intermediary transfer belt 14 and the cleaning blade 22 lowers, with the result that wearing of the cleaning blade 22 is suppressed for a long term.

Optical sensor

As shown in FIG. 1, on a side downstream of the image forming portion SBk, the optical sensor 23 is disposed so as to oppose the roller 30 through the intermediary transfer belt 14. The optical sensor 23 functions as a first detecting means for detecting reflected light reflected by the intermediary transfer belt 14 or the toner image formed on the intermediary transfer belt 14 by irradiating the intermediary transfer belt 14 or the toner image formed on the intermediary transfer belt 14 with light from a light source. By this, a toner application amount can be detected. Here, the toner application amount is a weight of the toner per unit area. The optical sensor 23 is disposed opposed to the roller 30 at a substantial center with respect to a longitudinal direction (rotational axis direction) of the roller 30, and is connected to the CPU 24. Incidentally, the toner application amount and density-related information (density or chromaticity) show a correlation therebetween, and hereinafter, these terms are used in the same sense in some instances.

The optical sensor 23 is constituted as shown in FIG. 3 by a light emitting element 231 such as an LED which is a light emitting portion, light receiving elements 232 and 233, a holder 234, and a circuit portion 235. The light emitting element 231 is a light source for irradiating the surface of the intermediary transfer belt 14 or the toner image formed on the intermediary transfer belt 14. The CPU 24 controls light emission intensity of the light emitting element 231 by controlling a driving circuit 236. The light receiving element 232 which is a first light receiving portion outputs a current depending on a light receiving amount to an IV converting portion 237. The light receiving portion 233 which is a second light receiving portion controls the current depending on the light receiving amount to an IV converting portion 238. The IV converting portion 237 covers the inputted current to a voltage and outputs the voltage to a gain adjusting amplifier 239. The IV converting portion 238 converts the inputted current to a voltage and outputs the voltage to a gain adjusting amplifier 240. The gain adjusting amplifier 239 which is a first amplifying portion amplifies the inputted voltage with a predetermined gain (first gain) and outputs an analog signal 241 to an A/D (analog-digital conversion) port of the CPU 24. The gain adjusting amplifier 240 which is a second amplifying portion amplifies the inputted voltage with a predetermined gain (second gain) and outputs an analog signal 242 to an A/D (analog-digital conversion) port of the CPU 24. Incidentally, the gain in each of the gain adjusting amplifiers 239 and 240 is adjusted and set by the CPU 24.

The light receiving element 232 is provided in a position where so-called regularly reflected light reflected by the surface of the intermediary transfer belt 14 at the same angle as irradiation light is detected. On the other hand, the light receiving element 233 is provided in a position where so-called irregularly reflected light from the intermediary transfer belt 14 is detected. In this constitution, the optical sensor 23 irradiated a patch T formed on the intermediary transfer belt 14 with light from the light emitting element 231. The optical sensor 23 outputs, as regular reflection output, the reflected light reflected by the patch T, and outputs, as irregular reflection output, the reflected light received by the light receiving element 233, thus outputting the signals depending on light receiving amounts. Specifically, the optical sensor 23 outputs, to the CPU 24, a signal 241 as the regular reflection output and a signal 242 as the irregular reflection output. Hereinafter, the signal 241 outputted to the CPU 24 is also referred to as the regular reflection output, and the signal 242 outputted to the CPU 24 is also referred to as the irregular reflection output.

Spectral reflectance of each toner in the embodiment 1 is as shown in FIG. 4. FIG. 4 is a graph showing a wavelength (nm) in abscissa and a reflectance (%) in ordinate. In FIG. 4, a wide-pitch broken line represents the case where the patch T is a yellow (Y) patch, a solid line represents the case where the patch T is a magenta (M) patch, a narrow-pitch broken line represents the case where the patch T is a cyan (C) patch, and a chain line represents the case where the patch T is a black (Bk) patch. The spectral reflectance shows a change in reflectance when an object is irradiated with light while changing the wavelength. A region (range) (760 nm to 1000 nm) is a near-infrared region, and the reflectance in the near-infrared region is substantially the same and is a high reflectance (80% or more) for each color toner irrespective of the colors. Further, the reflectance in this region shows the same change depending on a change in toner application amount irrespective of the colors of Y, M, and C. Therefore, as the light emitting element 231 of the optical sensor 23 in the embodiment 1, an LED emitting near-infrared light in the neighborhood of 850 nm was used. Incidentally, in the case of the black (Bk), the spectral reflectance is less than 10% which is low, and this shows that the light in the near-infrared region is absorbed by the black (Bk) patch T.

Next, a characteristic of the reflected light detected, when the patch T is detected by this optical sensor 23 will be specifically described. As shown in part (a) of FIG. 5, the light with which the intermediary transfer belt 14 is irradiated is reflected by the surface of the intermediary transfer belt 14, and is detected by the light receiving elements 232 and 233.

However, the intermediary transfer belt 14 in the embodiment 1 is black and the projected portion of the surface thereof is a mirror surface, and therefore, most of the near-infrared light with which the intermediary transfer belt 14 is irradiated becomes the reflected light of regular reflection, so that most of the reflected light is detected by the light receiving element 232 and is little reflected by the light receiving element 233. Here, a regular reflection light quantity is expressed correspondingly to the number of arrows. On the other hand, as shown in part (b) of FIG. 5, when a patch of block toner tn1 is formed on the intermediary transfer belt 14, the regular reflection light quantity of the light from the intermediary transfer belt 14 decreases. This is because as is understood from the spectral reflectance of FIG. 4, the black toner tn1 absorbs near-infrared irradiation light and hides the surface of the intermediary transfer belt 14 which is a background by the patch itself.

A relationship between the toner application amount and the regular reflection light quantity of the patch at this time is one-to-one relationship as shown in part (c) of FIG. 5. In part (c) of FIG. 5, the abscissa represents the toner application amount and the ordinate represents the regular reflection light quantity. Part (c) of FIG. 5 shows that the regular reflection light quantity decreases with an increasing toner application amount. Further, part (c) of FIG. 5 also shows that the regular reflection light quantity abruptly decreases until the toner application amount becomes a predetermined amount and then a degree of the decrease in regular reflection light quantity becomes moderate even when the toner application amount increases. When this association is made in advance, the toner application amount of the patch can be acquired from the is regular reflection light quantity. That is, the CPU 24 is capable of acquiring the toner application amount of the patch on the basis of a detection result of the optical sensor 23.

On the other hand, when the patches of color toners of Y, M, and C are irradiated with the near-infrared light, as is understood from the spectral reflectance of FIG. 4, different from the case of the black toner, these patches reflect the irradiation light. Reflection at this time is almost irregular reflection. As a result, as shown in part (a) of FIG. 6, the regular reflection light detected by the light receiving element 232 is the sum of "light regularly reflected by background" which decreases with an increase in toner application amount and "light irregularly reflected by toner" which increases with the increase in toner application amount. In part (a) of FIG. 6, tn2 represents the color toner. Further, arrows radially shown from the color toner tn2 show the irregular reflection light.

Accordingly, a relationship between the toner application amount and the regular reflection light is as shown in part (b) of FIG. 6. In part (b) of FIG. 6, the abscissa represents the toner application amount and the ordinate represents a reflection light quantity. Further, in part (b) of FIG. 6, a thick solid line represents detection light, a thin solid line represents a regular reflection component detected by the light receiving element 232, and a broken line represents an irregular reflection component detected by the light receiving element 233. As shown in part (b) of FIG. 6, a sum of the thin solid line, which is a characteristic of the regular reflection, and the broken line, which is a characteristic of the irregular reflection, i.e., a negative characteristic as shown by the thick solid line, is obtained. The negative characteristic is a characteristic such that although the reflection light quantity decreases with the increase in toner application amount, the reflection light quantity starts to increase again when the toner application amount increases to a certain amount or more. This shows that the toner application amount required for detecting the toner application amount and the regular reflection light quantity do not show the one-to-one relationship. That is, the negative characteristic shows that even when the same reflection light quantity is detected, a plurality of toner application amounts, each corresponding to the reflection light quantity, are obtained. Therefore, there is a need to extract only the regular reflection component by removing the irregular reflection component from the regular reflection light detected by the light receiving element 232 when the patch is detected. In the embodiment 1, from the irregular reflection light detected by the light receiving element 233, the irregular reflection component contained in the regular reflection light detected by the light receiving element 232 is calculated. By subtracting the calculated irregular reflection component from the regular reflection light detected by the light receiving element 232, only the original regular reflection component is extracted. As a result, as regards the relationship between the toner application amount and the regular reflection light quantity, a one-to-one relationship as shown by the regular reflection component (thin solid line) of part (b) of FIG. 6 is obtained.

Optical characteristic at imprint overlapping portion

FIG. 7 shows an enlarged schematic view of a part of the surface of the intermediary transfer belt 14. Also, in FIG. 7, a circulation direction (movement direction) H (which is also an R14 direction of FIG. 1) of the intermediary transfer belt 14 and a direction I perpendicular to the circulation direction H are shown. Incidentally, the direction I is also the rotational axis direction (the above-described longitudinal direction) of the rollers 13, 19, and 30. The intermediary transfer belt 14 subjected to the imprint processing includes projected portions 143 and recessed portions 144 which are periodical with respect to the I direction perpendicular to the circulation direction H. The imprint processing is started in the H direction from a position 145 where the imprint processing is started (hereinafter, referred to as a start position) and is performed to a position 146 where the imprint processing is ended (hereinafter, referred to as an end position). The end position 146 of the imprint processing is disposed in a position which is away from the start position 145 by about 5-10 mm, and therefore, an imprint overlapping portion (hereinafter, referred to as an IO portion) 147 as an optically specific region (described later) is formed. Incidentally, regions in which the imprint processing does not overlap with respect to the circulation direction I of the intermediary transfer belt 14, i.e., regions excluding the IO portion 147, are referred to as imprint non--overlapping portions 148.

The recessed portions 144 in the IO portion 147 cause a deviation with respect to the I direction with high probability. This is due to that the intermediary transfer belt 14 moves in the I direction during the imprint processing. When this deviation is caused, in the IO portion 147 relative to the imprint non-overlapping portions 148, a ratio of the projected portions 143 to an entire area (region) decreases. Here, the entire area means that the area extends over the imprint non-overlapping portions 148 with respect to the circulation direction H and extends over a full-length region of the intermediary transfer belt 14 with respect to the direction I. Further, in the IO portion 147, the imprint processing is performed two times, and therefore, a depth of the recessed portions 144 becomes deeper. For these reasons, in the IO portion 147, compared with the imprint non-overlapping portions 148, the reflection light quantity in the regular reflection direction when being irradiated with the light decreases. That is, the intermediary transfer belt 14 includes a region, which is a part of the region thereof, optically different in detection result by the optical sensor 23 from other regions excluding the part of the region thereof.

Part (a) of FIG. 8 shows a regular reflection output corresponding to substantially one full circumference of the intermediary transfer belt 14. In part (a) of FIG. 8, the abscissa represents a position [mm] of the circumferential (circulation) direction h of the intermediary transfer belt 14, and the ordinate represents a voltage value [V] as the regular reflection output. Further, the abscissa also represents the IO portion 147 and the imprint non-overlapping portions 148. The regular reflection output fluctuates depending on the position of the intermediary transfer belt 14, and largely decreases particularly in the neighborhood of the IO portion 147. The regular reflection output in the neighborhood (500 mm-600 mm) of the IO portion 147 is enlarged in part (b) of FIG. 8. The abscissa and the ordinate in part (b) of FIG. 8 are the same as those in part (a) of FIG. 8. The regular reflection output voltage is roughly about 2.5 V over full circumference of the intermediary transfer belt 14, whereas at this drop portion (IO portion 147), the regular reflection output voltage is dropped to about 1.3 V. Thus, the IO portion 147 is the optically specific region different in optical characteristic from the imprint non-overlapping portions 148.

For detection accuracy of the optical sensor 23, it is desirable that a difference between an output when the toner is not applied and the regular reflection output when the toner is applied is large, i.e., that a dynamic range is broad. For that reason, when the regular reflection output lowers as in the neighborhood of the IO portion 147, the dynamic range becomes narrow and is liable to be influenced by noise, so that a lowering in detection accuracy of the toner application amount is invited. Accordingly, in order to accurately detect the toner application amount of the patch, there is a need to avoid that a patch forming position becomes the IO portion 147.

Image Density Control Step

The image density control step in the embodiment 1 includes the following steps.

1. IO portion detecting step (optically specific region detecting step) (fourth measurement)
2. Belt peripheral length measuring step (peripheral length measuring step)
3. Background measuring step (second measurement)
4. Patch measuring step (test toner image measuring step) (first measurement)

Here, the belt peripheral length refers to a length (length corresponding to one full circumference) of the intermediary transfer belt 14 with respect to the circumferential direction H of the intermediary transfer belt 14, and the background refers to the surface (surface layer 142) of the intermediary transfer belt 14. In the embodiment 1, the CPU 24 carries out control so that the patch measuring step, which is the first measurement, and the background measuring step, which is the second measurement, are executable. In the case where the background measuring step is executed, the CPU 24 carries out control so that a second toner image (gain adjusting patch T1 (described later)) is formed for supplying the toner to the nip in a second region, which is a region different from a first region (described later). The patch measuring step is a step of detecting the reflected light by the optical sensor 23 by irradiating a first toner image (patch Ta (described later)) with light from a light source. The background measuring step is a step of detecting the reflected light by the optical sensor 23 by irradiating the surface of the intermediary transfer belt 14 with light from the light source.

In the following, the image density control step will be described using a flowchart of FIG. 9 and a timing chart of FIG. 10 showing a relationship between narrow regions. Incidentally, in FIG. 10, (i) shows the case where the belt peripheral length is a lower-limit value in a design allowable range, (ii) shows the case where the belt peripheral length is a so-called nominal dimension (nominal value, ideal value), and (iii) shows the case where the belt peripheral length is an upper-limit value, in which the abscissa represents a timing (certain time). Incidentally, the timing corresponds to the position of the circulating intermediary transfer belt 14, so that the abscissa can also be said as considered the position of the intermediary transfer belt 14. In FIG. 10, a downward diagonal hatching portion represents the IO portion 147, and a dotted hatching portion represents a margin. Further, in FIG. 10, the above-described steps 1 to 4 are also shown.

IO Portion Detecting Step

As described above, in order to accurately detect the toner application amount of the patch, the patch forming position is required to avoid the IO portion 147, and therefore, first, the position of the IO portion 147 is detected.

First, the CPU 24 detects appropriate timings such as turning-on of the power source of the main assembly of the image forming apparatus 100, an elapsed time from the turning-on of the power source, the number of sheets printed (the number of sheets subjected to image formation), an environmental change, an instruction from a host computer or a user, and the like. By this, the CPU 24 starts the image density control step including a step (hereinafter abbreviated as S) 902 and later.

In S902, the CPU 24 starts an initial operation of the main assembly of the image forming apparatus 100, such as rotation of the photosensitive drum 1 and the intermediary transfer belt 14 at a predetermined process speed (for example, 160 mm/s) and charging of the photosensitive drum 1. In S903, the CPU 24 controls the driving circuit 236 and causes the light emitting element 231 of the optical sensor 23 to emit light with a predetermined light quantity. In S904, the CPU 24 starts sampling of the regular reflection output. With a start of light emission of the optical sensor 23 in S903, the analog signal 241 of the regular reflection output of the optical sensor 23 is converted to a 10-bit digital data by the A/D converter in the CPU 24, and then the sampling is made at a predetermined interval, for example, at a 0.1 mm-interval. Hereinafter, this 0.1 mm-interval is also referred to as a 0.1 mm-step.

The optical sensor 23 is capable of detecting the regular reflection light and the irregular reflection light as described above. However, the regular reflection light sensitively reflects a change in surface state of the intermediary transfer belt 14, and therefore, the regular reflection output is used for detecting the IO portion 147. At this time, a gain GrO of the regular reflection output set for the gain according to amplifier 239 is se at about ½ of a maximum output so that the output is not saturated with reliability. Specifically, the optical sensor 3 in the embodiment 1 is 5 V in maximum output, so that the gain GrO is set at about 2.5 V by the CPU 24.

In S905, the CPU 24 monitors a change in regular reflection output while making the sampling and continues update of a maximum value Vrmax of the regular reflection output and overwrites and stores the maximum value Vrmax in the RAM 25 in real time every update. In S906, the CPU 24 detects a timing t1 when the regular reflection output is below a threshold Vt and a timing when the regular reflection output exceeds the threshold Vt, due to a local drop of the regular reflection output as shown in part (b) of FIG. 8. The CPU 24 causes the RAM 25 to store the detected timing t1 as a start timing Ts of the IO portion 147 and the detected timing t2 as an end timing Te of the IO portion 147. On the other hand, the update of the maximum value Vrmax is continued. The peripheral length of the intermediary transfer belt 14 is not determined at this time, so that a maximum value corresponding to one full circumference of the intermediary transfer belt 14 can be acquired by performing the update of the maximum value correspondingly to 805 mm in consideration of a nominal value of 800 mm and a maximum peripheral length variation amount of ±5 mm due to belt peripheral length tolerance. When the update of the maximum value Vrmax is performed correspondingly to 805 mm, in S907, the CPU 24 stops the sampling of the regular reflection output and waits until the IO portion 147 reaches the detecting position again. The start timing Ts acquired in S906 is used as a reference for subsequent steps.

In S908, the CPU 24 calculates a gain Gr for the regular reflection output. When the start timing Ts is determined, the CPU 24 performs gain adjustment for the regular reflection output by using the maximum value Vrmax when the gain is the, gain GrO stored in the RAM 25. That is, for the maximum output of 5 V of the optical sensor 23, Vrtgt obtained by converting an adjusting target value of 4 V with a margin to a 10-bit data (=3277 dec) and a 10-bit data of 4096 dec for 5 V are used. The gain Gr for the regular reflection output in subsequent measurement is calculated by the following equation:

$$Gr = Vrtgt/V\max \times GrO.$$

The resultant gain Gr is stored in the RAM 25.

Belt Peripheral Length Measuring Step

In order to measure the belt peripheral length, the CPU 24 resumes the sampling of the regular reflection output from 10 mm (margin) before the nominal value of 800 mm of the peripheral length of the intermediary transfer belt 14 from the start timing Ts. Here, the process speed is 160 mm/s, and therefore, a time in which the intermediary transfer belt 14 moves 790 mm from the start timing Ts is 4.94 (nearly equal to 790 mm/160 mm/s) sec. For this reason, in S909, the CPU 24 discriminates whether or not 4.94 sec has elapsed from the start timing Ts by making reference to the timer 40. In the case where the CPU 24 discriminated that 4.94 sec has elapsed, the process is returned to S909, and in the case where the CPU 24 discriminated that 4.94 sec has not elapsed, the CPU 24 causes the process to go to S910. In S910, the CPU 24 changes the regular reflection output gain of the optical sensor 23 from G0 to Gr, and starts the sampling of the regular reflection output. Here, resultant data is referred to as regular reflection output data U1(i) (i>0, positive integer). In this case, i represents a position of the sampling on the intermediary transfer belt 14 and is also referred to as a point. Further, a timing when the regular reflection output gain is changed to G0 and the sampling of the regular reflection output data (i) is started is referred to as a timing Ts1. (see FIG. 10).

As shown in FIG. 10, even in the case of the belt peripheral length upper limit, in order to enable sampling of the data of the IO portion 147, a maximum width of the IO portion 147 was 10 mm, and a sampling width of the regular reflection output patch U1(i) was 25 mm. As described above, the sampling is performed by the 0.1 mm-step, and therefore, as the regular reflection output data U1(i), 251 data in which i ranges from 0 to 250 are obtained. In S911, the CPU 24 causes the RAM 25 to store regular reflection output data U1(0) to U1(250), and the sampling is stopped. In S912, the CPU 24 discriminates whether or not the intermediary transfer belt 14 rotates (moves) further one full circumference again, i.e., whether or not 4.94 sec has elapsed from the timing Ts1. In the case where the CPU 24 discriminated in S912 that 4.94 sec has not elapsed from the timing Ts1, the process is returned to S912, and in the case where the CPU 24 discriminated in S912 that the 4.94 sec has elapsed from the timing Ts1, the CPU 24 causes the process to go to S913. A timing when 4.94 sec has elapsed from the timing Ts1 is referred to as a timing Ts2 (see FIG. 10).

In S913, the CPU 24 resumes the sampling of the regular reflection output from the timing Ts2 and stores the data as sampling data. Ur(i). In S914, the CPU 24 sets a gain of the gain adjusting amplifier 240 of the optical sensor 23 (this gain is referred to as an irregular reflection output gain) at an initial value GsO, and also starts sampling of irregular reflection output data Us(i).

In S915, the CPU 24 makes the sampling of the regular reflection output data. Ur(i) correspondingly to 40 mm, and calculates a peripheral length L of the intermediary transfer belt 14. As the regular reflection output data Ur(i), 401 data in which i ranges from 0 to 400 are obtained. For calculation, the regular reflection output data U1(0) to U1(250) and the regular reflection output data Ur(0) to Ur(400) which are stored in the RAM 25 are used. The regular reflection output data Ur(i) are sampling data before and after the IO portion 147 in subsequent circulation. The regular reflection output data U1(i) and Ur(i) are measured values of the regular reflection light reflected from the surface of the intermediary transfer belt 14, and reflect the surface state of the intermediary transfer belt 14. Therefore, in the following method, a deviation amount of the sampling data is calculated.

In the embodiment 1, I(X) defined by the following formula is used. X is a deviated amount (described later).

$$I(X) = \sum_{i=0}^{250} |U1(i) - Ur(i+X)|$$

I(X) shows a value obtained by integrating an absolute value of a difference between the regular reflection output data U1(i) in first circulation (turn) and the regular reflection output patch Ur(i+1) in second circulation (turn) in which the measuring position is shifted (deviated) by a "deviated amount" X point, from a measurement start position in the first circulation to 250 point (25 mm). Incidentally, a calculation range of the deviated amount X is X–0, 1, 2, . . . , 150.

First, the CPU 24 calculates an integrated value I(0) when X=0, and causes the RAM 25 to store a result of the calculation. Then, the CPU 24 increments the value of X by 1 and similarly calculates an integrated value I(1) when X=1, and then causes the RAM 25 to store the calculation result. These steps are repeated until X becomes 150. That is, the CPU calculates the integrated value to I(150). Incidentally, when I(150) is calculated, the regular reflection output data U1(250) and the regular reflection output data Ur(400(=250+150)) when i=250 are used.

Then, the CPU 24 acquires a value of X when I(X) becomes minimum. The surface state of the intermediary transfer belt 14 is not uniform, and therefore, measured values detected from the same point are not only very similar to each other, but also a pattern of the change in measured values has no periodicity. For that reason, the deviated amount X when I(X) becomes minimum becomes the deviation amount for the same sampling position of the regular reflection output data U1(i) and the regular reflection output data Ur(i). Accordingly, when Ur(i) is shifted by the deviated amount (deviation amount) X, data in the same sampling position of the regular reflection output data U1(i) can be obtained.

This state is shown in FIG. 11. In FIG. 11, the abscissa represents a position (or point), and the ordinate represents the regular reflection output data. Further, FIG. 11 also shows a sampling start position of the regular reflection output data U1(i) and a sampling start position of the regular reflection output data Ur(i). In FIG. 11, the regular reflection output data U1(i) and the regular reflection output data Ur(i) in a certain point section are plotted. FIG. 11 shows that when the deviation amount X is 59 (X =59), sampling data of the regular reflection output data U1(i) and regular reflection output data U1(i+X) coincide with each other, and (IX) becomes minimum, The sampling of the regular reflection output data Ur(0) is started after 4.94 sec (after 790.4 mm) from the timing Ts1; so that the peripheral length L [mm] of the intermediary transfer belt 14 in this embodiment can be calculated by:

$$L=790.4+X\times 0.1.$$

Incidentally, in the embodiment 1, the sampling is made in the 0.1 mm-step. The CPU 24 causes the RAM 25 to store the calculated peripheral length L.

Background Measuring Step

The background measuring step is a step of measuring a state of a surface (background) of the intermediary transfer belt 14 before the patch is formed on the intermediary transfer belt 14. When the background measuring step is started, the CPU 24 forms the gain adjusting toner image before the state of the intermediary transfer belt 14 is measured. Specifically, in S916, in order to adjust a gain of the irregular reflection output of the optical sensor 23 first, the CPU 24 forms the gain adjusting toner image (hereinafter, referred to as a gain adjusting patch T1). The CPU 24 generates reference signals (Y-Top, M-Top, C-Top) for the colors in order to form an image of the gain adjusting patch Tl so that the gain adjusting patch T1 is formed behind the IO portion 147 with respect to the travelling direction at a predetermined timing. Incidentally, a patch for the black (Bk) with no irregular reflection output is not formed since there is no need to adjust the gain thereof. Then, the CPU 24 sends, to the exposure device 11, image data of each of the gain adjusting patch T1 for the colors generated from the pattern generating portion 28 on the basis of the reference signals for the colors. In order to accurately detect the irregular reflection output, there is a need to set an optimum gain providing a broad dynamic range. Therefore, the image data of the gain adjusting patch T1 is FFH (solid image) by which the irregular reflection light quantity becomes largest. Then, the CPU 24 causes the exposure device 11 to irradiate the photosensitive drums 1Y, 1M, and 1C with the laser beams 12Y, 12M, and 12C, respectively, so that latent images of the associated gain adjusting patches T1 are formed on the photosensitive drums 1Y, 1M, and 1C.

Gain Adjusting Patch for Gain Adjustment of Irregular Reflection Output

The gain adjusting patch T1 also functions as a lubricating toner image for the cleaning blade 22. FIG. 12 is a schematic view showing the gain adjusting patch T1 formed on the intermediary transfer belt 14 in S916, and also shows the IO portion 147 and the circulation direction H. As shown in FIG. 12, a width with respect to the main scan direction is an image formable width Wg, and a width with respect to the sub-scan direction is 7 mm. Here, the width with respect to the main scan direction refers to a length with respect to the main scan direction, and the main scan direction is the rotational axis direction of the rollers 13, 19, and 30 perpendicular to the circulation direction H. Further, the sub-scan direction is a direction perpendicular to the main scan direction and corresponds to the circulation direction H. At this time, a position of formation of the gain adjusting patch T1 corresponds to two fill circumferences of a nominal length (800 mm) of the intermediary transfer belt 14 from a timing Te, and is disposed 10 mm behind the IO portion 147 in view of a tolerance. In FIG. 10, the patch forming position is indicated as a "gain adjusting patch start point (START POINT)" by a (vertical) broken line. By doing so, as shown in (iii) of FIG. 10, the gain adjusting patch T1 is not formed on the IO portion 147 even at the belt peripheral length upper limit. Here, the gain adjusting patch T which is the second toner image includes portions T1*a* and T1*b* as the lubricating toner images when a portion as the gain adjusting patch detected by the optical sensor 23 is T1*a* (within a broken line frame). The portion T1*b* is a portion which is not detected by the optical sensor 23, and has a function as the lubricating toner image. The portion T1*a* which is a third toner image is formed in a first region detectable by the optical sensor 23 on the intermediary transfer belt 14, and is a toner image for adjusting a second gain. The gain adjusting patch T1 includes the portion T1*a* and the portion T1*b*. Incidentally, the portion T1*b* is formed in a second region which is a region of the intermediary transfer belt 14 different from the first region.

In S917, the CPU 24 updates a maximum value Vsmax. The CPU 24 monitors a change in irregular reflection output data Us(i) while continuing sampling of the regular reflection output data Ur(i) and Us(i) started from the belt peripheral length measuring step. Then, the CPU 24 continues update of the maximum value Vsmax of the irregular reflection output, and overwrites and stores the maximum value Vsmax in the RAM 25 in real time every update.

In S918, the CPU 24 calculates the gain Gs. When the CPU 24 discriminated that the gain adjusting patch T1 passes through the detection position of the optical sensor 23, thereafter, the CPU 24 does not use the regular reflection output data Us(i), so that the CPU 24 stops the sampling. Further, the CPU 24 performs gain adjustment for the irregular reflection output by using the maximum value Vsmax of the irregular reflection output when the gain is the gain Gs0 stored in the RAM 25. That is, by using Vstgt (=3277 dec) obtained by converting, to 10-bit data, an adjusting target output 4 V which is provided with a margin for a maximum output 5 V of the optical sensor 23 and using 10-bit data of 4096 dec for 5 V, the gain Gs for the irregular reflection output for use in subsequent measurement is calculated by the following equation:

$$Gs=Vstgt/V\text{smax}\times GsO.$$

The calculated Gs is stored in the RAM 25. Incidentally, the sampling of the regular reflection output data Vr(i) and storage of the regular reflection output data Ur(i) in the RAM 25 are continued to during a subsequent patch measuring step. The gain adjusting patch T1 passes through the detection position of the optical sensor 23, and then reaches the cleaning nip 32, as the lubricant.

Patch Measuring Step

In S919, the CPU 24 forms patches for the colors in the patch measuring step. The CPU 24 generates color reference signals (Y-Top, M-Top, C-Top, Bk-Top) for forming patch images at predetermined timings in consideration of a peripheral length L of the intermediary transfer belt 14 determined on the basis of a timing Ts2. Then, on the basis of the color reference signals, the CPU 24 sends, to the exposure device 11, the respective color image data generated from the pattern generating portion 28. Then, along a rotational direction of each of the photosensitive drums 1Y, 1M, 1C, and 1Bk, latent images consisting of a group of, for example, 17 patches are formed by predetermined image data. Each of the patch groups for the respective colors is constituted by image data consisting of FFH (solid black portion), 8H, 10H, 20H, 30H, 40H, 50H, 60H, 70H, 80H, 90H, A0H, B0H, C0H, D0H, E0H, and F0H. These image data will be referred to as PY1 to PY17, PM1 to PM17, PC1 to PC17, and PBk1 to PBk17 for each color. Each one of these patches is, for example, a 10×10 mm square.

The latent images of these patches are developed by the developing units 8Y, 8M, 8C, and 8Bk under application of a predetermined developing voltage, so that the patches are formed on the photosensitive drums 1Y, 1M, 1C, and 1K, respectively. The patches PY1 to PY7, PM1 to PM17, PC1 to PC17, and PBk1 to PBk17 are transferred onto the intermediary transfer belt 14 under application of predetermined primary transfer voltage to between the photosensitive drums 1Y, 1M, 1C, and 1Bk and the primary transfer rollers 4Y, 4M, 4C, and 4K. The patch transfer positions at this time start from for example 5 mm behind the position of formation of the gain adjusting patch T1 so as not to overlap with the position where the gain adjusting patch T1 is formed in the last circulation (see FIG. 12). On the intermediary transfer belt 14, a patch T2 as shown in part (b) of FIG. 13 is formed in a place corresponding to the measuring position of the optical sensor 23. Incidentally, an interval corresponding to one patch (1 mm) is provided between adjacent color patch groups. On the basis of a result of detection of the reflected light reflected by the patch T2 which is the first toner image formed in a position (first region) detectable by the optical sensor 23 on the intermediary transfer belt 14, the CPU 24 controls an image forming condition when the image is formed on the transfer material P.

In the background measuring step, when the lubricating toner images (portions T1*a* and T1*b*) including the gain adjusting patch T1 (portion T1*a*) reach the cleaning nip 32, the frictional force between the cleaning blade 22 and the intermediary transfer belt 14 abruptly lowers. For this reason, the intermediary transfer belt 14 slips in some instances. For that reason, there is a possibility that the IO portion 147 reaches the detection position of the optical sensor 23 earlier than an original timing, so that the sampling in the patch measuring step is started earlier than the original timing when the IO portion 147 reaches the detection position, by a time corresponding to 10 mm. In S920, the CPU 24 starts the sampling at a timing Ts3 calculated by (L (mm)−10 (mm))/160 (mm/s) on the basis of the timing Ts2 (see FIG. 10). Data obtained by the sampling started in S920 are referred to as regular reflection output data Pr(i) and irregular reflection output data Ps(i). The CPU 24 causes the RAM 25 to store the regular reflection output data Pr(1) of the optical sensor 23 and the irregular reflection output data Ps(i) set for the gain Gs. Incidentally, at this time, the measurement of the regular reflection output data Ur(i) is continuously made.

In S921, the CPU 24 ends the sampling of the regular reflection output data Ur(i) when the regular reflection output data Ur(i) is measured in a section in which a margin of 40 mm is added to the peripheral length L from the timing Ts2. This section in which the timing Ts2 is a start point is represented by a double-pointed white arrow as "Ur(i) sampling (L+40) mm". In S922, as regards the sampling of the regular reflection output data Pr(i) and the irregular reflection output data Ps(i), the CPU 24 ends the sampling when measurement is made in a section in which a margin of 50 mm is added to the peripheral length L of the intermediary transfer belt 14 from the timing Ts3. This section in which the timing Ts3 is a start point is represented by a double-pointed white arrow as "Pr(i), Ps(i) sampling (L+50) mm".

In S923, the CPU 24 removes the patch T2 for which the measurement is ended, i.e., the toner images of PY1 to PY17, PM1 to PM17, PC1 to PC17, and PBk1 to PBk17, by the cleaning blade 22.

In S924, the CPU 24 makes correction of the background data because all the samplings are ended. By using regular reflection output data Ur(0) to Ur(400) in the neighborhood of the first IO portion 147 during the background measurement and regular reflection output data Ur(n) to Ur(n+500) in the neighborhood of the IO portion 147 in a subsequent circulation of the intermediary transfer belt 147, the CPU 24 calculates a slip amount during the background measurement with use of a formula J(X) shown below. J(X) is a formula similar to the above-described I(X) in which the deviation amount X is incremented. In the formula J(X), n is a point advancing from the timing Ts2 by (L−10) mm, and a calculation range of the slip amount is X=0, 1, 2, . . . , 100.

$$J(X) = \sum_{i=0}^{400} |Ur(i) - Ur(n+i+X)|$$

$$n = 10 \times (L - 10)$$

When the slip does not occur, J(X) becomes minimum at X=100. In the case where the slip occurs, J(X) becomes minimum in a range of 0<X<100, and at this time, the slip amount is (100–X) [0.1 mm].

Therefore, in the case where X when the J(X) becomes minimum satisfies 0<X<100 (in the case where the slip occurs), the background data correction is made. A timing when occurrence of the slip is predicted is a timing when the gain adjusting patch T1 detected by the optical sensor 23 reaches the cleaning nip 32. Therefore, in the embodiment 1, a section in which the slip is predicted to occur (hereinafter, referred to as a predicted slip section) is set at S to S+200 on the basis of the timing Ts2. S and a slip occurrence range (200) were set from a mechanical dimension and margin. The slip amount is (100–X) [0.1 mm], so that when the slip occurs, 201 items of data obtained originally by the sampling in the section S to S+200 are decreased to (101+X) items of data. In order to accurately calculate the toner application amount of the patch, there is a need that a background measuring position and a patch measuring position on the intermediary transfer belt 14 are made coincident with each other. For that reason, the decreased sampling data is interpolated by the following method.

Interpolation of Data Corresponding to Decrease by Occurrence Of Slip

For example, when the slip amount is 3 mm (X=70), the number of items of sampling data which is originally 201 items of data is decreased to 171 items of data. Here, a table 1 is a table for illustrating an interpolation method.

TABLE 1

| | 0 | 1 | 2 | . . . |
|---|---|---|---|---|
| (1) | S | S + 0.85 | S + 1.7 | |
| (2) | Ur(S) | Ur(S + 0.85) | Ur(S + 1.7) | |
| (3) | Uc(S) | Uc(S + 1) | Uc(S + 2) | |
| . . . | 198 | 199 | 200 | |
| | S + 168.3 | S + 169.15 | S + 170 | |
| | Ur(S + 168.3) | Ur(S + 169.15) | Ur(S + 170) | |
| | Uc(S + 198) | Uc(S + 199) | Uc(S + 200) | |

In a first row of the table 1, points (0 to 200) corresponding to sampling sections on the intermediary transfer belt 14 in the case where the slip does not occur are shown. In a second row of the table 1, points obtained by subjecting the points in the first row to a process (1) (described later) are shown. In a third row of the table 1, regular reflection output data Ur(S), which correspond to the points in the second row and which are obtained by performing a process (2) (described later) are shown. In a fourth row of the table 1, regular reflection output data Uc(S), which correspond to the points in the second row and which are obtained by performing a process (3) (described later) are shown.

First, as shown in (1) of the table 1, sections S to S+170 in which the sampling data are described are equally assigned to 201 points corresponding to the original sections S to S+200. That is, 0.85 (=170/200)×j (j: integer of 0 or more) is added to S. Specifically, the sections are assigned so that point 0 is S, point 1 is S+0.85, point 2 is S+1.7, . . . , point 20 is S+17, . . . , point 200 is S+170. At this time, the points S to S+170 include points which are decimals. Suffixes of the regular reflection output data Ur(i) which are background data are expressed by those shown in (2) of the table 1 when the sections S to S+170 are changed to the sections S to S+200.

Of the points of (2), for example, the point 20 is S±17, and therefore, data of the point 17 may be used. However, of the points of (2), data of the decimal points are not sampled, and therefore, these data are calculated using the sampled data. For example, the regular reflection output data Ur(S+0.85) can be acquired by performing interpolation represented by the following formula with use of data of the section including S+0.85, and Ur(S) and Ur(S+1).

$$\begin{aligned} Uc(S+1) &= Ur(S+0.85) \\ &= \frac{Ur(S+1) - Ur(S)}{(S+1) - S} \times \{(S+0.85) - S\} + Ur(S) \end{aligned}$$

Thereafter, similarly, the data Ur(S+1.7) to Ur(S+170) are acquired and are substituted for corresponding Uc(i) as shown in (3) of the table 1. Here, Uc(i) are the regular reflection output data after the interpolation of the above-described formula, and i ranges from S to S+200. Specifically. Uc(S)=Vr(S), Uc(S+1)=Ur(S+0.85), . . . , Uc(S+199) =Ur(S+169.15), and Uc(S+200)=Ur(170).

By this, background data Ur'(1) after correction are represented as follows with use of the deviation amount X.

$Ur'(i)=Ur(i)$ $i=0, . . . ,S-1$ $Ur'(i)=Uc(i)$ $i=S, . . . ,(S+200)$ $Ur'(i)=Ur(i-(100-X))$ $i=(S+201), . . . ,10XL+400$

As a result, even in the case where the slip occurs, the data are corrected to the background data when the slip does not occur.

Sampling of the regular reflection output data Pr(i) and the irregular reflection output data Ps(i) is started from a position advancing from the position of the regular reflection output)) i data Ur(0) by (L–10) mm. For this reason, data measured in the same position as the position of Ur(0) on the intermediary, transfer belt 14 unless the slip occurs are the regular reflection output data Pr(100) and the irregular reflection output data Ps(100). In this case, when the slip is taken into consideration, the data are the regular reflection output data Pr(X) and the irregular reflection output data Ps(X).

Therefore, corrected regular reflection output data Pr'(i) =Pr(i+X) and corrected irregular reflection output data. Ps'(i)=Ps(i+X) are defined. Further, regular reflection output data Pr'(i) and the irregular reflection output data Ps'(i) are obtained by shifting the regular reflection output data Pr(i) and the irregular reflection output data Ps(i) by X, respectively. By this, measuring positions of the corrected background data Ur'(i), the corrected regular reflection output data Pr'(i), and the corrected irregular reflection output data Ps'(i) can be made coincident with each other. At this time, the positions (points) are i=0, . . . , 10XL+500–X.

Description wilt be returned to the description of the flowchart of FIG. 9. In S925, the CPU 24 extracts measured values corresponding to the patches and measured values corresponding to the background of the patches, and acquires densities as density related information of the patches. When the toner patch of FFH formed on the intermediary transfer belt 14 reaches the detection position of the optical sensor 23, irrespective of the color of the toner, the regular reflection light quantity changes as shown in part (a) of FIG. 14. In FIG. 14, the abscissa represents a time, and the ordinate represents the regular reflection light quantity. The optical sensor 23 is adjusted so that the regular reflection light quantity when there is no patch on the surface of the intermediary transfer belt 14 (hereinafter, referred to as a background level) becomes Vrtgt (=about 3277 dec) at the maximum.

In this state, when the FFH patch reaches the detection position of the optical sensor 23*a*, the regular reflection light quantity decreases to about ¼ of Vrtgt. At this time, when a point 121 where the regular reflection light quantity becomes V2 of Vrtgt is a leading end of the patch and a point 122 is a trailing end of the patch, a length of the patch calculated from a time between the points 121 and 122 well coincides with the length of the actual patch. Therefore, a point of time when the regular reflection light quantity is increased from the background level to Vrtgt/2 corresponds to the leading end of the patch. Incidentally, as described above with reference to FIG. 8, even in the IO portion 147, a similar lowering in regular reflection light quantity occurs.

Each of the patches PY1, PM1, PC1, and PBk1 of part (b) of FIG. 13 is a solid image of image data FFH, and these patches are reference patches for extracting patch data. First, the CPU 24 checks whether or not when i=1, regular reflection output data Pr(i) of the regular reflection light stored in the RAM 25 is Vrtgt/2 (=1638 dec) or less. When Pr(i)>Vrtgt/2 holds, i is increased by 1 and the CPU 24 checks a subsequent regular reflection output data Pr(i). In the regular reflection output data Pr(i), measured data of the IO portion 147 is always contained before measured data of the patch.

For this reason, when Pr(i)≤Vrtgt/2 first holds, the CPU 24 discriminates that the regular reflection output data Pr(i) is the measured data of the IO portion 147 and disregards this data. Then, the CPU 24 discriminates that i (=m) when the regular reflection output data Pr(i) once exceeds Vrtgt/2 and then Pr(i)≤Vrtgt holds again is the leading end of the patch.

Part (b) of FIG. 14 shows a relationship between the patch PY1 and a measuring region (hereinafter, referred to as a measuring spot) PY(x) of the optical sensor 23. As shown in part (b) of FIG. 14, the measuring spot RY(m) when discriminated as the leading end of the patch PY1 does not completely fall within the patch PY1. A measured value at this time does not reflect the density of the patch PY1. The density of the PY1 is reflected after the measuring spot PY(x) completely falls within the patch PY1.

In the embodiment 1, a central portion of 6 mm in which the measuring spot RY(x) sufficiently falls within the patch PY1 and which is 2 mm inside each of the leading end and the trailing end of the patch PY1 is a region in which the density of the patch PY1 is reflected. Accordingly, when the patch is a first patch PY1, data at m+20 to m+79 are effective data. That is, regular reflection output data Pr(m+20) to Pr(m+79) and irregular reflection output data Ps(m+20) to Ps(m+79) which are measured at the measuring points RY(m+20) to RY(m+79) are data reflecting the density of the first patch PY1.

Therefore, density data D(i) at each of the measuring points is acquired by using density-related data (i), the regular reflection output data Pr(i) and the irregular reflection output data. Ps(i) which are acquired in S920, and data of Vr(i) acquired until S921, for example, in accordance with the following formulas:

$$s(i)=(Pr(i)-\alpha\times Ps(i))/Ur(i)$$

$$D(i)=f(sci))$$

In the above formulas, α is predetermined coefficient, and f(x) is a converting means such as a formula or a table in which the density-related data s(i) is associated with the density data D(i). The density-related data s(i) max be a method in which calculation is made using another formula or another table. D(i) may be another index, other than the density, data such as chromaticity difference ΔE in CIE color system.

These density data D(i) are calculated in a range of regions (m+20) to (m+79) of the point i, and thereafter, a density DY1 of the first patch PY1 can be acquired by, for example, averaging calculated values.

Densities DY2 to DY17 of remaining patches PY2 to PY17 for Y are acquired by averaging various density data as follows:

$$PY2: D(m+120) \text{ to } D(m+179)$$

$$PY3: D(m+220) \text{ to } D(m+279)$$

$$\ldots$$

$$PY16: D(m+1520) \text{ to } D(m+1579)$$

$$PY17: D(m+1620) \text{ to } D(m+1679)$$

When i becomes i>m+1679 where the patch for Y is ended, the leading ends of the reference patches C, M, and Bk are similarly detected by the optical sensor 23. Thus, the respective patch densities DY1 to DY17, DM1 to DM17, DC1 to DC17, and DBk1 to DBk17 are calculated and stored in the RAM 25.

Description will be returned to the description of the flowchart of FIG. 9. In S926, when the patch densities for the image data for the respective colors are calculated, on the basis of the calculated densities, the CPU 24 carries out feed-back to the image forming condition so as to provide a predetermined density and a predetermined graduation characteristic, and then ends the image density control step.

Validity of Toner Image Forming Timing of Toner Image for Lubrication

The toner image for lubrication in the image density control step (hereinafter, this image is referred to as a lubricating toner image achieves an effect of imparting a lubricating property to the cleaning nip 32 even when the lubricating toner image is formed in either one of the following steps.

1. IO portion detecting step
2. Belt peripheral length measuring step
3. Background measuring step
4. Patch measuring step In this embodiment, it is particularly preferred that the lubricating toner image is formed in (3. Background measuring step). The reason therefor will be described in the following.

In the IO portion detecting step, the position of the IO portion 147 is not specified, and therefore, it cannot be grasped that the lubricating toner image is formed in which position on the intermediary transfer belt 14. For that reason, in the case where the lubricating toner image reaches the cleaning nip 32, when a positional relationship such that the IO portion 147 reaches, the detection position of the optical sensor 23 is established, a drop amount of a signal in the IO portion 147 is decreased by the slip in some instances. By this, there is a liability that a subsequent patch forming position overlaps with the IO portion 147 by erroneously detecting the position of the IO portion 147 or a width of the IO portion 147. In the IO portion detecting step, in order to reduce down time in gain adjustment of the regular reflection output, the gain is set at ½ of the maximum output at which saturation does not occur. This is also liable to cause the erroneous detection in the case where the slip occurred. In order to avoid this, there is a need to perform the IO portion detecting step after the lubricating toner image passes through the cleaning nip 32, and therefore, excessive rotation of the intermediary transfer belt occurs.

When the lubricating toner image reaches the cleaning nip 32 during the belt peripheral length measuring step, there is a possibility that the intermediary transfer belt 14 slips and thus the belt peripheral length is erroneously detected as being short. This erroneous detection of the belt peripheral length causes noncoincidence between the background and the patch forming position in subsequent calculation of the patch density, so that there is a liability that a lowering in accuracy of the density calculation is invited.

When the lubricating toner image is formed during the patch measuring step, the lubricating toner image is formed in the final stage of the image density control step. In order to send the lubricating toner image at an earlier timing as can be possible, a timing of formation of the lubricating toner image is made as earlier than the patch measuring step as possible.

From the above consideration, even when the slip of the intermediary is transfer belt 14 occurs, a timing when the lubricating toner image is formed during the background measuring step in which correction can be made is an optimum timing.

Incidentally, as regards the position of formation of the lubricating toner image, in addition to the position 10 mm behind the IO portion 147 as in the embodiment 1, the lubricating toner image may be formed in another position in the background measuring step when the patch forming position during the patch measuring step is adjusted. However, in the case of the image forming apparatus 100 having the constitution in the embodiment 1, there is a need that the timing when the lubricating toner image reaches the cleaning nip 32 is made earlier than the exposure start timing of the patch during the patch measuring step. This is because there is a possibility that the slip of the intermediary transfer belt 14 has the influence on the rotation of the photosensitive drum 1 and thus the latent image of the patch and the toner image are disturbed. Further, the gain adjusting patch T1 is formed in a region on the intermediary transfer belt 14 in which a longitudinal width when the lubricating toner image reaches the cleaning nip 32 corresponds to a length of the cleaning blade 22 with respect to a direction perpendicular to the movement direction of the intermediary transfer belt 14. The longitudinal length when the gain adjusting patch T1 functioning as the lubricating toner image reaches the cleaning nip 32 may desirably be, for example, 70% or more of the longitudinal width of the cleaning nip 32 in order to obtain an effective lubricating property.

As described above, in the embodiment 1, the lubricating toner image is formed during the image density control step, so that the frictional force of the cleaning nip of the intermediary transfer member can be reduced. Further, the lubricating toner image is formed during the background measuring step, so that the frictional force of the cleaning nip can be effectively lowered without causing unnecessary down time and a lowering in accuracy of the density calculation of the patch. Further, by employing a constitution in which the lubricating toner image includes the gain adjusting patch, a toner consumption amount can be minimized.

As described above, according to the embodiment 1, in the image density control of the image forming apparatus, the frictional force of the cleaning nip can be reduced.

In the following, an image forming apparatus 100 according to an embodiment 2 will be described. Incidentally, constituent elements having constitutions and functions (actions) similar to those in the embodiment 1 will be omitted from description by adding the same reference numerals or symbols. In the embodiment 1, the toner image as the lubricant was always formed during the image density control, but the embodiment 1 is characterized in that the frictional force in the cleaning nip is predicted and the lubricating toner image is changed depending on the predicted frictional force. Here, the lubricating toner image refers to the portion T1*b* of the gain adjusting patch T1 described with reference to FIG. 12, and the portion T1*b* is used for adjusting the gain Gs of the gain adjusting amplifier 240.

For the prediction of the frictional force, an environment (absolute humidity) data in which the image forming apparatus 100 is placed and a time in which the image forming apparatus 100 is left standing until the image density control is executed are used.

As shown in part (a) of FIG. 15, the image forming apparatus 100 of the embodiment 2 includes an environment sensor 41 which is a second detecting means for detecting a state of an environment in which the image forming apparatus 100 is installed.

Here, a state of the environment is a temperature and/or a humidity, water content (absolute water content), and the like. The temperature and/or the humidity max be detected as a relative value or an absolute value. In the embodiment 2, the environment sensor 41 detects an absolute humidity, for example. Incidentally, the environment sensor 41 is disposed in a position where the environment sensor 41 is not influenced by a device for generating heat, such as the fixing device 21 or a power source device (not shown). Further, the CPU 24 measures the time in which the image forming apparatus 100 is left standing, by a timer 40 which is a measuring means for measuring the time. The CPU 24 changes a mode of the gain adjusting patch T1, in other words, the lubricating toner image on the basis of a detection result by the environment sensor 41 and/or an elapsed time. Here, the mode of the lubricating toner image includes at least one of a color (Y, M, C), the number of colors, a toner application amount (density), and a shape of the toner image.

A table 2 shown below is a frictional force prediction table showing a relationship between an absolute humidity (g/kg (DA)) and a frictional force predicted from a standing time. In the table 2, in a first column, absolute humidity values (<6 g/kg (DA)), 8, and the like) are shown, and in a second column and subsequent columns, standing times (<1 (hour), 3, and the like) are shown. For each of the standing times, frictional forces (A to Z) for the associated absolute humidity values in the first column are shown. Here, as regards the frictional force, A represents that the frictional force is highest, and D represents that the frictional force becomes low. That is, the frictional force becomes lower from A. B, C, . . . in the named order. When attention is paid to a predetermined standing time, the frictional force becomes higher with a higher absolute humidity. Further, when attention is paid to the predetermined standing time, the frictional force becomes higher with a longer standing time.

TABLE 2

| | <1 (hr.) | 3 | 5 | 7 | 9< |
|---|---|---|---|---|---|
| <6 (g/kg (DA)) | E | E | E | E | E |
| 8 | D | D | D | D | C |
| 10 | D | D | C | C | C |
| 12 | C | C | C | B | B |
| 14 | C | C | B | C | B |
| 16 | B | B | B | A | A |
| 18 | B | B | A | A | A |
| 20< | A | A | A | A | A |

Depending on these frictional forces, setting is made so that:

in the frictional force A, solid lubricating toner images are required correspondingly to the three colors, in the frictional force B, a solid lubricating toner image is required correspondingly to one color, in the frictional force C, lubricating toner images of image data 40H are required correspondingly to the three colors, in the frictional force D, a lubricating toner image of image data 40H is required correspondingly to one color, and in the frictional force E, there is no lubricating toner image.

That is, with an increasing frictional force, the CPU 24 makes the density of the lubricating toner image (gain adjusting patch T1) higher and/or makes the number of colors used for the lubricating toner image larger. For example, in the case where the image forming apparatus 100 is left standing for 5 hours in an environment of an absolute humidity of 14 g/kg (DA), from the table 2, the frictional force is predicted as "B", so that it is discriminated that the solid lubricating toner image is required correspondingly to one color. Further, for example, when the standing time is 9 hours or more at the absolute humidity of 20 g/kg (DA), the frictional force is predicted as "A", and therefore, the solid lubricating toner images are formed correspondingly to the three colors.

Incidentally, in the case where the frictional force is predicted as "E", discrimination that the lubricating toner image is not needed is made, but this means that discrimination that the portion T1*b* as the lubricating toner image is not needed is made. Incidentally, in the case where the frictional force is predicted as "E", when there is no need to calculate the gain Gs for the irregular reflection output, the portion T1*a* as the gain adjusting patch may be made unnecessary. Further, when the frictional force is predicted, the prediction may be based on only a detection result of the environment sensor 41 or only an elapsed time.

In accordance with the frictional force prediction table of the table 2, by changing the lubricating toner image, it is possible to supply the lubricating toner image in a necessary minimum amount in various environments and various standing conditions. Thus, in the embodiment 2, the CPU 24 changes the mode of the lubricating toner image (T1*b*) depending on at least one of the absolute water content and the elapsed time from the last image formation.

Incidentally, the image forming apparatus according to the present invention is not limited to those in the above-described embodiments, but may be changed variously within the scope of the subject matter of the present invention.

1) As the background of the patch, only the regular reflection light was measured, but the irregular reflection light may be measured in combination and may be used for calculating the density.

2) The number of patches may be numbers other than 17 for each of the colors, and the image data, a manner of arrangement, and the order of the colors can be arbitrary selected.

3) The patch forming position was the center, but may be either one of left and right end portions, and the optical sensor may be changed in mounting position corresponding to the patch forming position.

4) The patch forming position is each of opposite end positions, and the number of optical sensors is increased to two correspondingly to the patches, so that the patches formed may be divided into a left-side patch and a right-side patch.

5) The lubricating toner image is decreased in toner application amount depending on the image data, and as another example, the lubricating toner image may be divided into lubricating toner images for each of the colors as shown in part (b) of FIG. 15.

Here, part (b) of FIG. 15 is a schematic view showing a gain adjusting patch T3 and is similar to FIG. 12 except for the gain adjusting patch T3. The gain adjusting patch T3 includes a portion T3*a* as the gain adjusting patch detected by the optical sensor 23, and portions T3*a* and T3*b* as the lubricating toner images. The portion T3*b* includes the Y data divided to two portions and the C patch divided to two portions. Thus, the lubricating toner image may be divided for each of the colors.

6) A plurality of optical sensors may be divided with respect to the longitudinal direction so as to oppose an auxiliary roller and correspondingly thereto, a plurality of patch forming positions may be set.

7) In addition to the color image forming apparatus of the in-line type, the present invention is also applicable to a color image forming apparatus of, for example, a rotary including a plurality of developing devices for a single photosensitive drum as is well known conventionally.

8) In addition to the image forming apparatus of the intermediary transfer member type, the present invention is also applicable to an image forming apparatus in which an image is formed by directly transferring a toner image onto a transfer material carried on a transfer material carrying member and in which a patch for image density control is formed on the transfer material carrying member.

As described above, according to the embodiment 2, in the image density control of the image forming apparatus, the frictional force in the cleaning nip can be reduced.

According to the present invention, it is possible to reduce the frictional force in the cleaning nip in the image density control of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-069005 filed on Apr. 19, 2022, which is hereby incorporated by reference herein in its entirety.

What is claimed is:

1. An image forming apparatus comprising:

an endless image bearing member;

a toner image forming portion configured to form a toner image on the image bearing member;

a light source configured to irradiate a surface of the image bearing member and the toner image formed on the image bearing member with light;

a detecting portion configured to detect reflected light reflected by the image bearing member or the toner image formed on the image bearing member by irradiating the image bearing member or the toner image formed on the image bearing member with light from the light source, the detecting portion including a first light receiving portion configured to receive regular reflection light from the image bearing member or the toner image formed on the image bearing member and a second light receiving portion configured to receive irregular reflection light from the image bearing member or the toner image formed on the image bearing member;

a removing member configured to form a nip in contact with the image bearing member and to remove toner from the image bearing member in the nip; and a controller configured to control an image forming condition when the toner image is formed on a transfer material, on the basis of a result that the reflected light reflected by the toner supplied to a first region detectable by the detecting portion on the image bearing member is detected, wherein the controller carries out control so that a first measurement for detecting the reflected light by the detecting portion by irradiating the toner with the light from the light source and a second measurement for detecting the reflected light by the detecting portion by irradiating the surface of the image bearing member with light from the light source are made executable, wherein in a case that the second measurement is executed, the controller carries out control so that the toner is supplied to the nip in a second region different from the first region, wherein when the second measurement is started, the controller carries out control so that the toner is supplied to the nip in the second region before a state of the image bearing member is measured, and wherein the toner supplied to the nip in the second region is supplied to a position detectable by the detecting portion on the image bearing member and includes toner for detecting the irregular reflection light by the second light receiving portion.

2. An image forming apparatus according to claim 1, wherein the second region is a region different from the first region in a direction perpendicular to a movement direction of the image bearing member.

3. An image forming apparatus according to claim 1, wherein the controller carries out control so that the reflected light is detected for measuring a density of the toner by the detecting portion in the first measurement.

4. An image forming apparatus according to claim 1, wherein the controller carries out control so that the reflected light is detected for measuring a state of the surface of the image bearing member by the detecting portion in the second measurement.

5. An image forming apparatus according to claim 1, wherein the controller carries out control so that the second measurement is executed before the first measurement.

6. An image forming apparatus according to claim 1, wherein the detecting portion includes:

a first amplifier portion configured to output a voltage depending on a light quantity of the regular reflection light received by the first light receiving portion by being amplified with a set first gain; and a second amplifier portion configured to output a voltage depending on a light quantity of the irregular reflection light received by the second light receiving portion by being amplified with a set second gain, and wherein the toner supplied to the nip in the second region is supplied to a position detectable by the detecting portion on the image bearing member and includes toner for adjusting the second gain.

7. An image forming apparatus according to claim 6, wherein the controller carries out control so that the toner is supplied to the second region on the image bearing member corresponding to a length of the removing member with respect to a direction perpendicular to a movement direction of the image bearing member.

8. An image forming apparatus according to claim 7, wherein the controller carries out control so that the toner is supplied to the second region on the image bearing member corresponding to 70% or more of the length of the removing member.

9. An image forming apparatus according to claim 8, further comprising:

a second detecting portion configured to detect a state of an environment in which the image forming apparatus is installed; and a measuring portion configured to measure an elapsed time from an end of image formation, wherein the controller changes a mode of the toner on the basis of a detection result by the second detecting portion and/or the elapsed time.

10. An image forming apparatus according to claim 9, wherein the second detecting portion detects an absolute humidity, and wherein a frictional force between the image bearing member and the removing member increases with a higher value of the absolute humidity and increases with a longer elapsed time.

11. An image forming apparatus according to claim 10, wherein the controller carries out control so that with a larger frictional force, a density of the toner in the second region is made higher and/or a number of colors used for the toner in the second region is increased.

12. An image forming apparatus according to claim 11, wherein the toner image forming portion further comprises:

a photosensitive member on which an electrostatic latent image is formed; and a developing member configured to develop the electrostatic latent image into a toner image with toner, wherein the image bearing member is an intermediary transfer member onto which the toner image formed on the photosensitive member is transferred.

13. An image forming apparatus according to claim 12, wherein the controller carries out control so that a third measurement for measuring a length corresponding to one full circumference with respect to the movement direction of the image bearing member is executed before the second measurement is executed.

14. An image forming apparatus according to claim 13, wherein a part of a region of the image bearing member with respect to the movement direction includes a region in which a detection result by the detecting portion is optically different from that in another region except for the part of the region, and wherein the controller carries out control so that a fourth measurement for specifying a position of the part of the region is executed before the third measurement is executed.

15. An image forming apparatus according to claim 11, wherein the toner image forming portion further comprises:

a photosensitive member on which an electrostatic latent image is formed; and a developing member configured to develop the electrostatic latent image into a toner image with toner, wherein the image bearing member is a transfer material bearing member for bearing a transfer material onto which the toner image formed on the photosensitive member is transferred.

16. An image forming apparatus according to claim 15, wherein the controller carries out control so that a third measurement for measuring a length corresponding to one full circumference with respect to the movement direction of the image bearing member is executed before the second measurement is executed.

17. An image forming apparatus according to claim 16, wherein a part of a region of the image bearing member with respect to the movement direction includes a region in which a detection result by the detecting portion is optically different from that in another region except for the part of the region, and wherein the controller carries out control so that a fourth measurement for specifying a position of the part of the region is executed before the third measurement is executed.

* * * * *